United States Patent [19]

Zito

[11] 4,069,371
[45] Jan. 17, 1978

[54] ENERGY CONVERSION

[75] Inventor: Ralph Zito, Durham, N.C.

[73] Assignee: GEL, Inc., Durham, N.C.

[21] Appl. No.: 678,638

[22] Filed: May 10, 1976

[51] Int. Cl.² ......................................... H01M 8/18
[52] U.S. Cl. .................................................. 429/21
[58] Field of Search .................... 429/15, 19, 20, 101, 429/107

[56] References Cited

U.S. PATENT DOCUMENTS

| | | | |
|---|---|---|---|
| 778,893 | 1/1905 | Reed | 429/107 |
| 3,811,946 | 5/1974 | Creutz et al. | 429/101 |
| 3,920,474 | 11/1975 | Zito et al. | 429/107 |

Primary Examiner—John H. Mack
Assistant Examiner—H. A. Feeley
Attorney, Agent, or Firm—Jerry Cohen

[57] ABSTRACT

An instantly refuelable energy conversion system comprises a multicell array wherein each cell has a cathode, a solid anode fuel selected from the class consisting of iron, zinc and nickel and a ferric (and/or +3 valence nickel or zinc) chloride liquid oxidizer. In power delivery (discharging) e.g., using iron alone, the reactions are:

At the anode, $Fe \rightarrow Fe^{++} + 2e$ yielding 0.44 volts,
At the cathode, $Fe^{+++} + e \rightarrow Fe^{++}$ yielding 0.75 volts, the overall reaction being:
$Fe + 2FeCl_3 \rightarrow 3FeCl_2$, i.e., 1.2 volts overall.

These reactions are reversible for electrical charging purposes. The oxidizer is recirculated continuously and chemical reaction between the oxidizer and solid fuel in the fully charged or partially charged system is limited by a diffusion barrier between the oxidizer and fuel so that reactions therebetween are predominantly electrochemical. The system is characterized by continuously countering the tendency of rising pH of anolyte, and/or of contaminant accumulation therein, to maintain stable operation over long periods, e.g., by using a main energy conversion system anolyte as a catholyte in an auxiliary, overdriven energy conversion system which at the same time the catholyte of the main system serves as anolyte of the auxiliary system with reliance on the richness of the liquid in hydrogen ion and $Fe^{+++}$ ion to chemically attack any elemental iron formed in the auxiliary system thereby further preserving stability. The iron may be substituted in whole or in part by zinc and/or nickel.

13 Claims, 24 Drawing Figures

CHARGING PROCESS

DISCHARGING PROCESS

ENERGY CONVERSION

BACKGROUND OF THE INVENTION

The present invention relates to energy conversion and more particularly to a rechargeable and/or refuelable high specific power delivery and high specific energy storage system.

A large number of portable power delivery and energy storage electrical devices including automobiles, golf carts, forklift trucks, garden appliances, construction equipment, portable motors and lighting units, require long life and reliable means for high specific power delivery and high specific energy storage capability ("specific" meaning with respect to weight). Low cost and long life energy storage systems are needed in the above applications and also in connection with data processors and instruments and load levelling. The state of the art, including the most promising of current R&D efforts, is summarized in Iammartino, "New Batteries Are Coming", Chemical Engineering magazine, pp 48–50, Jan. 20, 1975. The research and development efforts include use of the electrochemical pairs zinc-nickel oxide, metal-air (oxygen), sodium-sulfur, lithium - sulfide, zinc-chlorine and my own prior efforts with iron-ferric chloride.

It is an important object of the present invention to provide such a system free of the disadvantages of prior systems.

It is a further object of the present invention to provide low cost of initial capital equipment consistent with the preceding object.

It is a further object of the invention to provide low operating costs consistent with one or more of the precceing objects.

It is a further object of the invention to provide indefinitely long life of capital equipment consistent with one or more of the preceding objects.

It is a further object of the invention to provide substantially hazard-free operation and handling consistent with one or more of the preceding objects.

It is a further object of the invention to provide capability of being "refueled" immediately consistent with one or more of the preceding objects.

It is a further object of the invention to provide capability of being recharged electrically consistent with one or more of the preceding objects.

It is a further object of the invention to avoid the necessity for a complex chemical supply network of logistics consistent with one or more of the preceding objects.

It is a further object of the invention to provide odorless operation consistent with one or more of the preceding objects.

It is a further object of the invention to provide low freezing temperatures consistent with one or more of the preceding objects.

It is a further object of the invention to provide for complete discharge with no damage consistent with one or more of the preceding objects.

It is a further object of the invention to provide simple means of indicating remaining energy consistent with one or more of the preceding objects.

It is a further object of the invention to provide indefinitely long charge retention consistent with one or more of the preceding objects.

It is a further object of the invention to provide that when the system is turned off, there is no power available at the terminals, thus making the system electrically safe to handle when "deactivated" consistent with one or more of the preceding objects.

It is a further object of the invention to provide extremely plentiful and non-polluting materials employed consistent with one or more of the preceding objects.

It is a further object of the invention to provide an energy conversion device for which simple manufacturing methods can be employed consistent with one or more of the preceding objects.

SUMMARY OF THE INVENTION

According to the invention, an energy conversion system is made in a fashion to be rechargeable in situ as a secondary battery or, alternatively, instantly refuelable in the fashion of a solid liquid fuel cell and comprises a cathode and, when charged, a solid anode fuel comprising iron, zinc and/or nickel and a liquid oxidizer comprising ferric, zinc and/or nickel chloride. In power delivery (discharging) using iron alone, the reactions are:

At the anode, 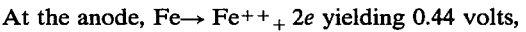 yielding 0.44 volts,

At the cathode, 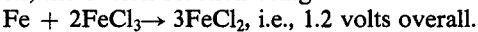 yielding 0.75 volts, the overall reaction being:

$Fe + 2FeCl_3 \rightarrow 3FeCl_2$, i.e., 1.2 volts overall.

These reactions are reversible for charging purposes. The oxidizer is recirculated continuously and direct chemical reaction between the oxidizer and solid fuel by physical contact in the fully charged or partially charged system is limited by a microporous membrane barrier between the oxidizer and fuels so that reactions therebetween are predominantly electrochemical.

The system is a solid/liquid energy converter in which the metal fuel of reducing agent is stored in a solid form within an electrode structure cartridge of the reactor. The anti-fuel or oxidizer is a liquid which is circulated through the reactor by an electric pump. The electric pump is powered by a very small percentage of the electric output of the reactor during operation.

Electrodes for power producing cells are within a reactor comprising multiple anolyte compartment and catholyte compartment containing cells in electrical series or parallel and fluid parallel array, activated only when the oxidizer is introduced into the cells. As the system is operated, delivering power to an external load, the solid fuel is oxidized, solubilized and carried into a recirculating liquid anolyte stream. Oxidizer dissolved in polar, preferably aqueous, solvent to form a catholyte is recirculated continuously and such recirculation involves continuous or semicontinuous draw from a reservoir preferably having at least ten times the combined volume of the catholyte compartments, for maximum energy density of the system.

Depending upon the application needs, the reactor can have stored into its structure when charged the equivalent of a single filling or many refillings of oxidizer tanks.

The addition of nickel salt and/or zinc salt in total or partial substitution of iron anolyte salt content reduces the oxidation (rusting) vulnerability of iron and reduces polarization. Nickel and zinc afford the same anodic multiple valence states as iron and therefore participates in electrochemical power generation in the same manner as iron as reducing agents. In applications where oxidation of iron may be a problem, oxidation inhibitors may be added to the anolyte electrolyte in lieu of nickel usage. These may comprise one or more of citrates, acetate, oxalate and tartarate compounds of alkali metals or ammonium, all of which compounds are soluble in water and alcohol and which readily ferrous and ferric compounds without affecting electrolyte conductivity significantly.

A sensor can be applied to anolyte and/or catholyte flows to determine resistivity or density thereof by optical or electrical means and such parameters are measures of the state of charge (or discharge) of the system.

The characteristics of the system are as follows. Catholyte is continuously recirculated during operation at a near-constant flow rate independent of converter output power level. Since no materials are expelled from the system and no materials are consumed, the total volume of fluid remains essentially the same from the start to the end of a charge. The catholyte reservoir can be removed and replaced by a tank containing new, regenerated fluids, or the reservoir may be drained of spent catholyte or refilled with fresh catholyte. When the array has been depleted of its stored fuel, it can be removed for "recharging" and replaced within a few moments by a freshly "charged" cartridge (or complete system) for continuous device operation. In most applications the charge or fuel stored in a cartridge will be sufficient for a number of refillings of oxidizer tank fluid.

Some examples of applications of the system are presented below. The weights and sizes given do not include external case or pump motors, A. Small portable tools and standard electric outboard trolling motors with a 200 to 300 watt range, can be served by a system which provides voltage of 12 volts, current of 15 to 20 amps, and operating times of about 16 hours (4 KWH) for the cartridge and about 2 hours (500 WH) for each catholyte refill to provide averaged power of about 250 watts. The size of reactor would be 13 lbs. and 0.08 ft$^3$ and the size of the tank would be 15 lbs. (1.16 ft$^3$, i.e. 1.3 gal.). For continuous operation at 250 watts the fluid must be replenished every two hours and the rechargeable cell array cartridge every 16 hours.

b. Heavy duty industrial tools, ride-on lawn tractors, and larger electric powered boats run at a 2 KW power level. These can be accommodated in several modes. For instance:

Mode 1: Assuming 16 hours per reactor, 2 hours per fluid tank, operating times for the cartridge of about 16 hours (32 KWH) and for the oxidizer of about 2 hours (4 KWH) yielding averaged power of about 2 KW, can use a 98 lbs. 0.6 ft$^3$) reactor and a 118 lbs. (1.25 ft$^3$, i.e. 10 gal.) catholyte reservoir tank.

Mode 2: Assuming 4 hours per reactor, 2 hours per catholyte reservoir, operating times for the cartridge of about 4 hours (8 KWH) and for the oxidizer of about 2 hours (4 KWH) yielding averaged power of about 2 KW can use a 24.6 lbs. (0.15 ft$^3$) reactor and a 118 lbs. (1.25 ft$^3$, 10 gal.) reservoir.

c. A medium sized, 4-passenger, 2500 lb. auto of the commuter car variety requires short refueling time, about 200 WH/mile of energy for propulsion at 40 to 50 mph speeds on level ground and top speed of 70 mph. The present invention can meet these requirements with a system affording: A range of about 1000 miles for the cell array and 100 miles per oxidizer fluid refill; a reactor size of about 650 lbs. and a 4 ft.$^3$ volume with 12 KW continuous output capability and about 20 KW peak power; oxidizer fluid tank size of 600 lbs. and 6.3 ft.$^3$ volume (50 gal.).

The reactor stores 200 KWH initially and grows progressively lighter by about 9% in weight with each of the ten catholyte reservoir refillings as the car is driven over 1,000 miles. The catholyte reservoir holds about 20 KWH of energy per refilling and must be replenished after every 1000 miles of average driving.

d. Load levelling for power delivery systems and/or emergency or standby power are served through the flexibility economy, safety and long life characteristics and versatility of the energy conversion system of the present invention.

In order to insure long lived operation in any of the foregoing applications, the energy conversion system should have means for preventing the formation of, or resolubilizing, iron oxide precipitate in the anolyte and catholyte. This is accomplished in accordance with the invention through certain filtration, alloying, bleed through an auxiliary energy converter with electrolyte reversal and overpotential driving and/or chelation.

It is necessary to address the question of pH variations in an iron-redox system to establish an operable and practical energy source. Iron salts such as the chlorides, sulfates, nitrates, etc. are soluble only in a low pH aqueous medium. Iron oxides, carbonates and hydroxides are liable to formation and precipitation as the pH is allowed to rise, (usually much above 3), especially where oxygen or other soluble gases such as $CO_2$ are available to the solution when expoed to air.

Ferrous ions in solutions are particularly susceptible to oxidation to ferric compounds. Oxygen will react with ferrous salt solutions producing insoluble ferric compounds. In addition to the above, we have the process of hydrogen gas liberation with which to contend. During the charging process when metallic iron is deposited on the anode surface hydrogen gas is also generated by the decomposition of $H_2O$. Even when a cell is on open circuit some $H_2$ gas is evolved due to the high population density of $H^+$ ions in solutions with pH in range of 1 to 2. Unfortunately there normally is not the immediate corresponding evolution of oxygen gas at the cathode to compensate for the lost hydrogen, with the restoration of pH. As $H_2$ gas evolves, OH ion concentration rises and pH increases accordingly.

According to the invention, a number of conditions are satisfied for the electrochemical couple to be electrochemically reversible:

use of a single fluid or ionic species in solution which can be separated electrically subsequent to diffusion from one electrolyte to the other.

use of components which can be electrodeposited out of solution in a separable manner.

means are provided for keeping the primary components physically separated but available at their respective electrode surfaces for later "discharge".

A review follows of the free energies of formation, (see *Oxidation Potentials*, 2nd Edition, W. M. Latimer, Prentice Hall, Inc.), for the various compounds of iron and chlorine which are possible in the fundamental processes associated with the iron-chloride aqueous system.

The formation energies for those compounds of primary concern to the matter of reversibility are listed in the table below.

| Substance | Free Energy of Formation (at 25° C) | |
| --- | --- | --- |
| | Physical State | F K cal/mole. |
| $H_2O$ | liq. | −56.7 |

-continued

| | Free Energy of Formation (at 25° C) | |
|---|---|---|
| Substance | Physical State | F K cal/mole. |
| OH | aq. | −37.6 |
| Fe++ | aq. | −20.3 |
| Fe+++ | aq. | −2.5 |
| FeCl$_2$ | solid | −72.2 |
| FeCl$_3$ | solid | −80.4 |
| FeO | solid | −58.4 |
| Fe$_2$O$_3$ | solid | −177.1 |
| Fe$_3$O$_4$ | solid | −242.4 |
| Fe(OH)$_2$ | solid | −115.6 |
| Fe(OH)$_3$ | solid | −166.0 |
| Cl | aq. | −31.4 |
| HCl | aq. | −31.4 |
| H+ | aq. | 00.0 |

The energy producing reaction results in a net free energy change of $$Fe + 2Fe^{+++} \rightarrow 3Fe^{++}$$

$$\Delta F + O + 2(-2.5) = 3(-20.3) \text{ k cal/mole}$$

or $\Delta F = -55.9$ k cal/mole, which corresponds to 80 watt-hours per pound of reagents at an open circuit potential of 1.21 volts.

During the charging portion of a cycle some hydrogen gas is liberated at the anode while plating iron onto the surface. The generation of H$_2$ in this manner tends to drive the anolyte less acidic causing a precipitation of iron hydroxides and/or oxides.

Oxygen dissolved in the electrolyte will also tend to precipitate the oxides of iron from a ferrous chloride solution. The generation of H$_2$ in this manner tends to drive the anolyte less acidic causing a precipitation of iron hydroxides and/or oxides.

Oxygen dissolved in the electrolyte will also tend to precipitate the oxides of iron from a ferrous chloride solution. Inspection of the energy balances for the possible reactions which may result in solubilizing iron oxides and hydroxides shows that the opportunity for structuring an electrically reversible system appears good.

When an Fe/FeCl$_3$ system is being recharged, the Fe++ ions are being oxidized to the Fe+++ state at the cathode surface. Chloride ions are diffusing to the cathode to balance the electrical charge. If, however, the current density exceeds the rate with which Fe++ ions are available for oxidation and if the driving voltage is high enough Cl$_2$ may be generated at the cathode. Cl$_2$ is moderately soluble in chloride solutions with the formation of complex ions. Also Cl$_2$ will react with water, especially in the presence of active carbon to form HCl.

In any event, the production of FeCl$_3$ in the cathode results in an increasingly acidic solution with high Cl ion concentration and the possibility of free chlorine in small concentrations. Iron oxides are then attacked by the chloride ions and/or free Cl$_2$ in such a fashion that FeCl$_2$ or FeCl$_3$ is regenerated with the creation of either H$_2$O or O$_2$ gas as the case may be.

Examination of the following reaction possibilities shows that their free energy changes are all in the desired direction. The net free energy change is negative.

If HCl is present in sufficient quantities, then the following reactions with the various oxides can be expected as typical processes.

$$FeO + 2H^+ \rightarrow Fe^{++} + H_2O$$

$$\Delta F -58.4 + O \rightarrow -20.3 -56.7$$

$$\Delta F = -18.6 \text{ K cal/mole}$$

$$Fe(OH)_2 + 2H^+ \rightarrow Fe^+ + 2H_2O$$

$$\Delta F -115.6 + O \rightarrow -20.3 + 2(-56.7)$$

$$\Delta F = -18.1 \text{ K cal/mole}$$

$$Fe(OH)_3 + 3H^+ Fe^{+++} + 3H_2O$$

$$\Delta F -166 + O \rightarrow 2.5 + 3(-56.7)$$

$$\Delta F = -6.6 \text{ K cal/mole}$$

If free chlorine were present in the electrolyte, some expected reactions would be as follows.

$$FeO + Cl_2 \rightarrow Fe^{++} + 2Cl^- + \tfrac{1}{2} O_2 \uparrow$$

$$\Delta F -58.4 + O -20.3 + 2(-31.4) + O$$

$$\Delta F = -24.7 \text{ K cal/mole}$$

$$Fe(OH)_2 + Cl_2 \rightarrow Fe^{++} + 2Cl^- + H_2O + \tfrac{1}{2} O_2 \uparrow$$

$$\Delta F -115.6 + O \rightarrow -20.3 + 2(-31.4) -56.7 + O$$

$$\Delta F = -24.2 \text{ K cal/mole}$$

Analysis of the majority of chemical reaction possibilities shows that the formation of iron oxides and hydroxides due to electrolysis of water and dissolved oxygen from the air are convertible to the soluble chlorides again by suitable recharging, filtering and fluid flow control techniques within the energy converter system.

An interesting energy consideration is the reaction between iron and HCl, Fe and FeCl$_2$. Iron will react with HCl to produce the ferrous chloride quite readily, as shown by the following calculations.

$$Fe + 2HCl \rightarrow FeCl_2 + H_2 \uparrow$$

$$\Delta F + O + 2(-31.4) \rightarrow -72.2 + O$$

$$\Delta F = -9.4 \text{ K cal/mole}$$

However, the reaction, $$Fe + 3HCl \rightarrow FeCl_3 + 3/2 H_2 \uparrow$$

$$\Delta F + O + 3(-31.4) \rightarrow -80.4 + O + \Delta F$$

$$\Delta F = +13.8 \text{ K cal/mole}$$

does not want to take place as indicated by the positive free energy.

The presence of HCl in FeCl$_2$ solution will not result in the oxidation of the ferrous ion, as evidenced by the energy balance below.

$$FeCl_2 + HCL \rightarrow FeCl_3 + 1/2 H_2 \uparrow$$

$$\Delta F -72.2 - 31.4 \rightarrow -80.4 + O$$

$$\Delta F = +23.2 \text{ K cal/mole}$$

Any approach to controlling pH or the rate of accumulation of sediment in an aqueous solution FeCl$_2$ and FeCl$_3$ electrolyte secondary cell must be compatible with all other system considerations.

The obvious means of pH maintenance by the addition of replacement H+ ions via HCl is not consistent with other imperatives since the electrolyte is continually driven off stoichiometric balance by the addition of Cl$^-$ ions. Eventually there are no ferrous, Fe$^{+2}$, ions remaining in the system even when in the discharged state due to irreversible oxidation processes. Tests have given about 3% to 5% figures for the ampere-hour loss factor or equivalent of H$_2$ gas generation during charge. Charging rates are between 6 and 12 amperes for a 60 in$^2$ area electrode, (e.g. about 0.10 to 0.20 amp/in$^2$), in these experiments. Hence, it would seem on this basis, that at the end of 15 to 22 cycles only about 50% of the energy storage capacity of the electrolyte remains in the form of available Fe++ ions because of the need to continually add HCl to the system. Care must also be taken to charge the system at a correspondingly decreasing ampere-hour value as the cycle numbers grow larger otherwise an inordinate amount of H$_2$ will be released by overcharging. The above numbers were arrived at by solving for $n$ in the equations $$(0.97)^n = 0.5,$$
$$\text{and } (0.95)^n = 0.5$$

A second, and more practical method in accordance with the present invention is to make use of the chemical dynamics at the cathode to restore pH and solubilize the alkaline precipitates. The catholyte is continuously being driven acidic during the charging process. Filters may be employed to separate out of the fluid stream solid particles which are formed in the anolyte during cycling. Periodically these filters are switched from the anolyte to catholyte streams where the collected insoluble iron-compounds are redissolved in the acidic electrolyte. In order to maintain an anolyte filter in operation at all times two filters are employed and their positions are interchanged periodically.

Laboratory devices ranging from single cells to 22 cell arrays have been operated in this fashion over hundreds of cycles with no net, accumulated deterioration in performance beyond the first few conditioning cycles. Teel water filter cartridges No. 1P753 manufactured by the Dayton Electric Manufacturing Company have been employed successfully over periods of many months of operation. Switching of line filters may be accomplished by two-way valves. They can be switched manually as desired or as the sediment level and corresponding fluid flow impedance changes would indicate.

Another method which is reasonably effective except for the efficiency losses due to electrolyte mixing involves the following simple steps.

Place a filter only in the catholyte line.
Periodically flush the anolyte through the catholyte by switching the valving such that the two hydraulic circuits are in series or such that they are both in parallel with the catholyte filter.

This periodic flushing of the anode side with catholyte, restores pH and removes precipitates which are tending to collect. Unfortunately, the introduction of Fe$^{+3}$ ions into the anolyte reduces efficiency because of the corresponding amp-hour loss by direct attack of iron plating by the ferric solution. We have implemented this method with success. Losses encountered are proportional to fluid volume sizes and frequency of flushing. This loss is reducible by design of a hydraulic circuit which retains most of the anolyte intact while the cell is merely flushed out with catholyte. Alternatively, it is possible to have a two filter system wherein the anolyte filter is reverse flushed periodically into the catholyte filter wihout ever interchanging filter circuits.

The residual catholyte in the pores of the anolyte filter after each such operation would also aid in lowering anolyte pH.

Partial or total reverse charging of a cell also restores pH and solubilizes iron compounds. The distinct disadvantage here is the additional time and energy required to accomplish this end. Even if a cell were to be designed in a symmetrical fashion and operable in either polarity, the energy lost in discharging the cell to zero from the "knee of curve" and the energy required to raise the level to the flat characteristic region in the opposite direction are significantly great to cause some dismay for load leveling applications.

An "active filter" may be employed in which the filtering and solubilizing of iron compounds is performed simultaneously at one surface.

The filter is an element which is the cathde of a single cell within a multiple cell energy storage array or as a separate auxiliary cell and is constructed of porous carbon. Composite carbons of this sort may comprise active carbon particles, graphite, and PVC binder. The porous carbon filter electrode becomes the positive electrode of a single cell and the anolyte is passed through this electrode filtering out precipitates onto the working surface. As electric current is passed through the cell the precipitates are resolubilized by becoming chlorides or iron again by either one of two processes; the direct electrolytic change from oxides or hydroxides to chlorides at the electrode surface, typical half cell reaction Fe$_2$O$_3$→Fe$^{+3}$ + 3/2 O$_2$ ↑ + 3e.

If the potential of this "filter cell" is great enough some free chlorine is generated at the porous cathode surface and reactions of this sort will take place, $$FeO + Cl_2 \rightarrow Fe^{+2} + 2Cl^- + \tfrac{1}{2} O_2 \uparrow$$

$$Fe(OH)_2 + Cl_2 \rightarrow Fe^{+2} + 2Cl^- + H_2O + \tfrac{1}{2} O_2 \uparrow$$

by direct Cl$_2$ reactions with the solid precipitates.

Some chlorine will react with water, (hydrolysis), and HCl, (hydrogen ions), will be generated giving a further decrease in pH in the immediate vicinity of this electrode. Active carbon catalyzes this hydrolysis.

An auxiliary cell may be employed in which O$_2$ gas is evolved and Cl$_2$ produced to decease pH in the anolyte. The fluid circuit is essentially the same as in the previous method. The cathode, (+), electrode, fluid line is connected into the anolyte circuit of a multiple cell array. Cl$_2$ and HCl is generated in this electrolyte by charging the single cell at a voltage which exceeds the decomposition potential of 1.80 volts.

An active carbon reaction chamber may be employed to accelerate the hydrolysis of Cl$_2$. Free chlorine in the circuit will tend to react with Fe$^{+2}$ ions and oxidize them to Fe$^{+3}$ ions resulting in no effective change in pH. This process needs to be suppressed in favor of hydrolysis with the corresponding generation of H$^+$ ions.

No iron plating is accumulated on the negative electrode of the auxiliary cell since the anode fluid is the catholyte circuit for the array and usually quite concentrated in oxidizing Fe$^{+3}$ ions. Hence, the auxiliary cell may be operated continuously with no need for discharge or reconditioning.

Operating conditions for the auxiliary cell are adjusted such that the electrical current flow and fluid flow through the positive electrode compartment are appropriate to produce a cell voltage over 1.8 volts and H$^+$ ion generation rate sufficient to adjust pH below 3 or 4. As the fluid flow decreases in the positive compartment, the $Cl_2$ and $H^+$ ion generation rate increases for the same electrical current density due to the decreasing availability of $Fe^{+2}$ ions.

Other objects, features and advantages of the invention will be apparent from the following detailed description with reference therein to the accompanying drawing in which

DETAILED DESCRIPTION OF PREFERRED EMBODIMENTS

Figure 1:
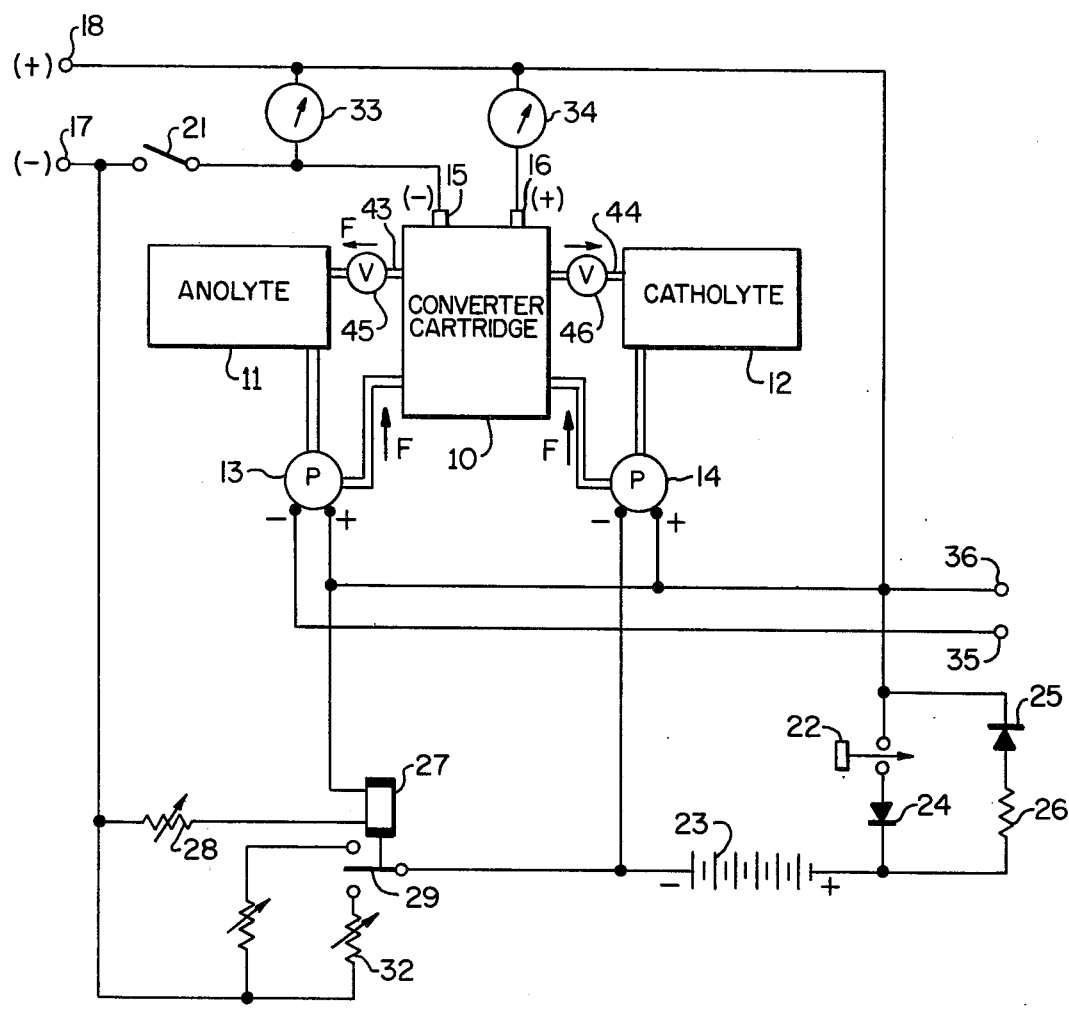
FIG. 1 is a schematic diagram showing the electrical interconnections of components of a portable power source including an anergy converter.
Figure 1A:
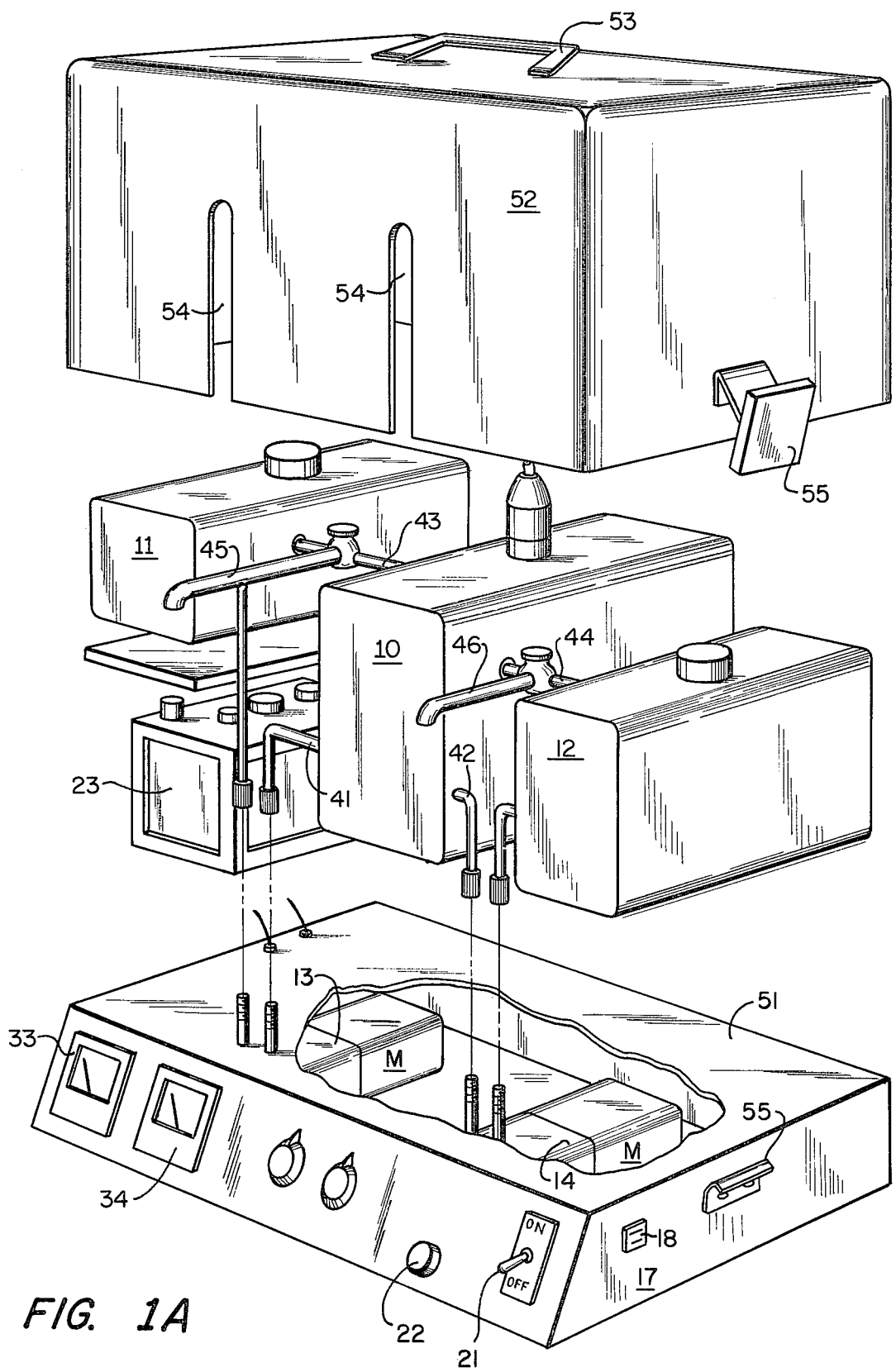
FIG. 1A is an exploded view of the mechanical components of such a power source.

Referring now to the drawing and more particularly to FIGS. 1 and 1A thereof, there is shown an energy converter 10 having two electrolyte flow circuits therein (not shown) — an anolyte flow circuit and a catholyte flow circuit. Anolyte and catholyte are respectively stored in tanks 11 and 12 respectively circulated by pumps 13 and 14. The converter provides power at output electrodes, viz. anode 15 (negative) and cathode 16 (positive) which are respectively connected to system output terminals 17 (negative) and 18 (positive). A main switch is provided for the system at 21 and a starting, spring-loaded, switch is provided at 22. A battery 23 is used for starting the pumps which are powered by electric motors M and for such starting is momentarily interconnected to such pumps by depressing switch 22 to put the battery in line with such pumps via protective circuit elements — diodes 24 and 25 and resistor 26.

A single pole-double draw relay 29, whose coil 27 is in series with a variable resistance 28 connects either of two variable dropping resistors 31 or 32 into the pump circuit in response to converter terminal voltage.

A voltmeter is provided across the converter terminals at 33 and an ammeter is interconnected in series with the converter at 34. Fill lines for the anolyte and catholyte circuits are shown at 41 and 42, respectively and return lines therefor are shown at 43 and 44, respectively, with valved parallel drain lines therefor at 45 and 46, respectively.

A mechanical arrangement for mounting the system of FIG. 1 as a suitcase-type power pack and comprising a base plate 51 housing the pumps and electrical control and measuring element is shown in FIG. 1A. The base plate 51 typically has a width of 23 inches and a depth of 15 inches and a height of 5 inches and a slanted front containing visual display elements of the meters and control knobs and switches for the circuit elements 22, 31 and 32 as well as the main switch 21. The output plugs and jacks, 17/18 and 35/36 are in the sides of the base plate. The converter 10, the tanks 11 and 12 and the battery 23 are mounted on top of the base plate and are surrounded by a cowling 52 with a carry handle 53, slots 54 accommodating the drain lines and latching elements 55 for closing up the unit and making the system liftable as a single unit.

Typical dimensions for the tanks 11, 12 and the converter tank 10 and the battery are:

tanks: 5½ inches wide, 10 inches long, 9 inches high and one pound dry weight

Converter: 5½ inches wide, 9 inches long, 11¼ inches high and 13 pounds dry weight Battery: 2¼ inches wide, 4¾ inches long, 5¼ inches high and 4 pounds dry weight Typical specifications for the hydraulic and electrical system are:

| | |
|---|---|
| Pumps 14 and 15: | Dayton Electric Company Teel, 1P811 marine pumps made of (f) Cycolac R material and weighing 0.8 lbs. each including weight of a driving motor therein and operating at 12 volts and 1.5 amperes each, and modified by replacing the stainless steel shaft with a fiberglass shaft |
| Battery 23: | Beck-Arnley 12N5-3B 4-lb., 12 volts motorcycle starter battery. |
| Converter 10 Open Circuit Voltage: | 24 volts |
| Converter 10 Steady State Operation: | 25 amperes and 16 volts with an internal resistance of about .3 ohm; |
| Tank 12: | 1.5 gallons (18 pounds) per hour 360W. |
| Tank 11: | .75 gallons; (7 pounds) per hour 360W. |
| Rheostat 31: | 0 to 5 ohms, 50 watts; |
| Rheostat 32: | 0 to 1 ohm, 10 watts; |
| Rheostat 28: | 0 to 10k ohms, |
| Resistor 26: | 30 ohms, 5 watts. |

Figure 2:
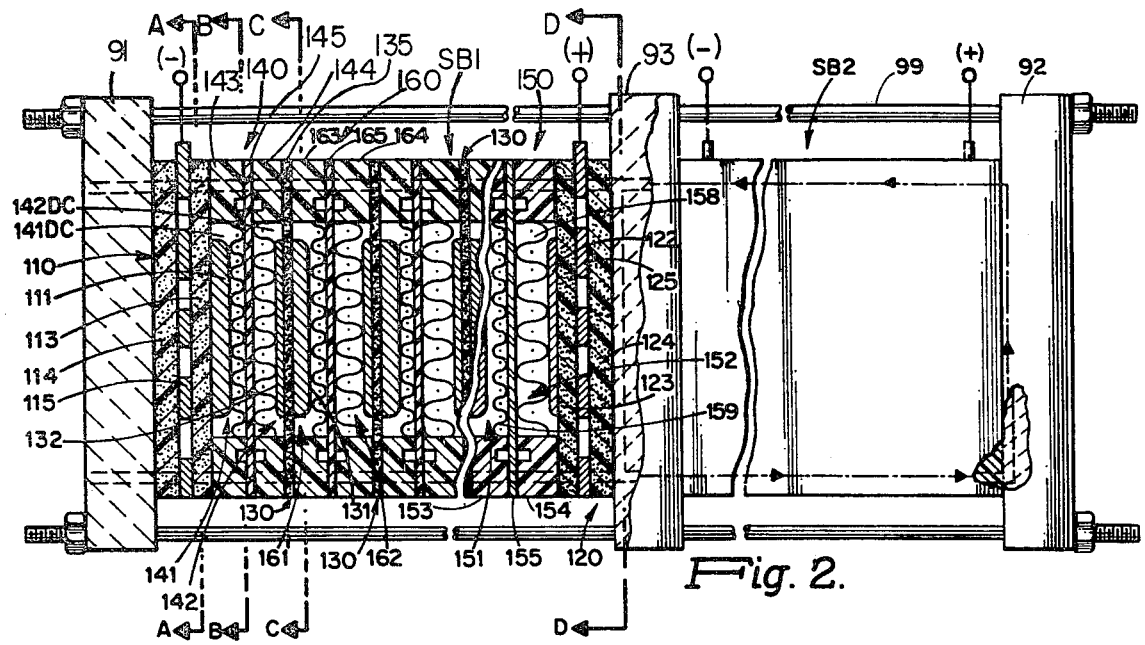
FIG. 2 is a sectional view of the energy converter component of the power source.

Referring now to FIG. 2, there is shown an energy converter comprising a stacked array of unit solid-liquid fuel cells, made up of an end electrode 110, an end cathode electrode 120 and a plurality of bipolar midelectrodes 130 forming first and second unit cells, 140 and 150, respectively at the longitudinal ends of the stack, with additional cells 160 formed therebetween by confronting bipolar electrodes 130 in electrical series and fluid parallel (i.e. parallel electrolyte feed and parallel electrolyte withdrawal for both anolyte and catholyte.

A diffusion barrier separator 145 divides cell 140 into anolyte compartment 141 and catholyte compartment 142. Similarly, a similar separator 155 divides cell 150 into anolyte compartment 151 and catholyte compartment 152 and similar separators 165 are provided for the intermediate cells dividing them into anolyte compartments 161 and catholyte compartments 162.

While only a small number of cells are shown in the stack for purposes of illustration, it will be appreciated that many more cells can be incorporated in such stack on the same principles.

The end anode electrode 110 comprises a layer 111 of metal which is bonded to a laminated terminal electrode structure comprising conductive (plastic/carbon composite) substrates 113, 114 which are sandwiched about an expanded metal screen 115.

Cathode electrode 120 comprises conductive sheet 122 with a charcoal coat mounted on a laminated terminal electrode structure which comprises conductive substrates 123, 124 sandwiched about an expanded metal screen 125. Bipolar mid-electrodes 130 have metal layers and charcoal layers 132 sandwiched about a central conductive substrate 135.

Frame gaskets 143, 144, 153, 154, 163, 164 space aid support the electrodes and membranes and complete the enclosure of slab-like electrolyte compartments 141, 142, 151, 152, 161, 162, respectively, serving as edges walls therefor. The gaskets can also provide conduits for feed and return of electrolyte shown in FIG. 2B where gasket 143, serving as edge wall for compartment 141 carried feed passage P3 which divides into branch channels 101, 102 to feed anolyte to upper corners 103, 104 of compartment 141 and return passage P5 which receives anolyte withdrawn from the lower corners of compartment 141 via a similar branched channel arrangement.

The conductive layers 113, 114, 123, 124, 135, and the substrates of cathodes 122, 132 comprise hot pressed mixtures of plastic and carbon, the plastic being polyvinylidene fluoride (PVF), polyvinyl chloride, polyethylene or teflon, PVF being preferred and the carbon being a finely divided graphite or carbon black. The cathode layers 122, 132 comprise charcoal pressed into the surface of a carbon plastic substrate which is in turn bonded to layers 120, 130. The metal layers 111, 131 are hot pressed onto 110, 120, 130. The laminates 113, 114, 115 and 123, 124, 125 are separately hot pressed before adding layers 111 or 112 thereto.

The separators 145, 155, 165 may be one mil thick 50% porous, electrochemical grade polypropylene film, such as Celgard or 10 mil thick 30% porous Daramic polyethylene electrochemical grade films or other known ion-permeable diffusion-limiting barrier membranes.

The end plates 91, 92 and spacer plate 93 can be machined or molded to make fluid passages and tie rod holes therein and the marginal edges of the electrode, gasket and membrane parts have aligned holes therein. They require application of sealants prior to assembly. The parts are then assembled as indicated in FIG. 1 and held in compression by tie rods 99 to form a block-like compact package.

Figure 2A:
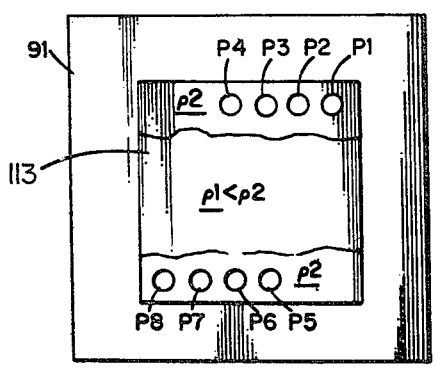
FIGS. 2A-2D are plan views of one of the separator elements of the converter.

FIGS. 2A–2D are plan views of components 113, 143, 130 and 93 viewed as shown at AA, BB, CC and DD respectively, in FIG. 2. They show the aligned ports P1–P8 running through the marginal portions of those stacked components to form longitudinal fluid flow passages. Certain of ports P1–P8 in end ports are blocked to define longitudinal dead ends of some passages. FIG. 2A shows that sheets 114 and 113 are made of graded resistivity so that there is a high resistivity between the ports and low resistivity in the central portion of such sheets where electrode surfaces are bonded.

Figure 2B:
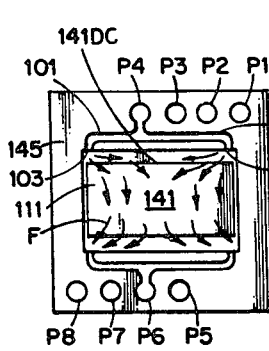
Figure 2C:
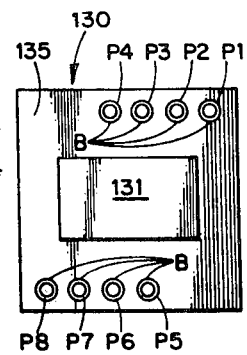

It is important to assure uniformity of electrolyte flow through the anolyte and catholyte compartments over the electrode surfaces and to limit short circuit losses between cells. The cell construction minimizes short circuit losses and enhances uniformity of flow. As shown in FIGS. 2, 2B and 2C wherein a distribution channel 141DC is provided in anolyte compartment 141 and a distribution channel 142FM is provided in the catholyte compartment 142. These channels serve as plenum chambers and are formed integrally with the compartment structure. Similar return channels are provided for the respective compartments in cells 140, 150 and 160. FIG. 2B indicates flow pattern (arrows F) for anolyte compartment 141. The feed passage in P3 branches into lateral delivery channels 101, 102 with respective corner exits 103, 104 at ends of channel 141DC at the upper corners of compartment 141. Typical cross-section dimensions for channel 141DC or 142DC are 1/16 × ⅛ inch (or more in the case of 141DC depending on the thickness of metal layer employed) and the thickness of the central portion of compartments 141 and/or 142, established by separation of the anode or cathode surfaces from the confronting surface of membrane 145, is typically 1/64 inch. The distribution channel and plenum chamber flow pattern is thus intrinsically established with minimal extraneous structure for this purpose and consistent with multiple spaced point fluid entry (or drain) at the cell compartment edge which allows a significant design length of parallel electrolyte flow paths (the length counterbalancing low electrolyte resistivity to establish an acceptably high intercell resistance (to be established in a small space within the overlapping margin of component cells of the cell stack.

Spacers (indicated for example at 158, 159) are set in the anolyte and catholyte compartments of each cell to establish a uniform spacing of anode and cathode electrodes from the thin barriers 145, 155, 165. The spacers comprise netting with raised crossovers between intersecting synthetic fiber threads (e.g. polypropylene). Alternatively, the net can be pressed into a corrogated form to permit fluid flow while maintaining said spacing.

Figure 2D:
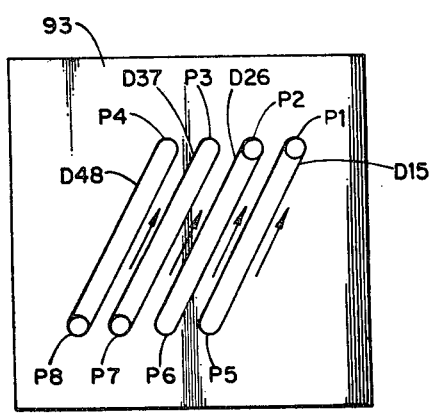

Referring to FIG. 2D, transverse channels D15, D26, D37 and D48 are formed as troughs in plate 93 and they butt against substrate 124 to form complete elongated passages P1 to P5, P2 to P6, P3 to P7 and P4 to P8. Passages P1, P2, P7 and P8 may continue through plate 93 to feed a further array of cells SB2 utilizing common anolyte and catholyte recirculating means for both SB1 and 2.

FIG. 2B is a plan view of the spacing gasket frame 143. It is made of insulating material, e.g. polyvinyl chloride and is provided with ports P1-P8 which are punched through during or after frame manufacture. If ports P1-P8 are formed after frame manufacture, only a single molding die is necessary to form the shapes of all frames 143, 144, 163, 164, 123, 124 and the troughs 101, 102 (upper and lower) therein and a single multiple hole punch can form ports P1-P8 for all overlapping parts 113, 114, 123, 124, 143, 144, 145, 153, 154, 155, 163, 164, 165. The metal screens 115 and 125 would be short enough to be by-passed by ports P1-P8 and, in practice, would extend out of electrodes 110 and 120 in a direction rotated 90° from the direction shown in FIG. 2 for convenience of illustration.

FIG. 2B shows anolyte feed through P3 and drain through P5 and catholyte feed would be in P4 and drain in P6. However, it is useful in some instances to have cross-over, i.e. anolyte feed at P3, drain at P6 and catholyte feed at P4, drain at P5, in order to balance their flow patterns in the cell compartments by compensating flow resistance in the respective tributary feed and drain passages.

FIG. 2C indicates a plan view of the bipolar electrode laminate 130. The raised anode surface 131 is so proportioned in size that its side edges can be readily conformed to sides of frame 144 to prevent side leakage of electrolyte around the electrode.

FIGS. 2, 2B and 2C show that the raised electrodes, e.g., anode layer 131 in bipolar laminate 130 have a lesser height than the compartments and are positioned to form the manifolds (e.g., 141DC, 142DC of FIG. 2).

Typical manufacturing conditions which have been used for making cells of the type shown in FIG. 1 are:

(1.0) for making sheets 114, 124, (1.1) Mix 50% 3548 Kynar (PVF copolymer) with 50% Dixon Grade 1112 graphite. Sieve PVF copolymer to break up clumps.

(1.2) Blend for 3 minutes in PK blender without agitator bar plus 3 minutes with agitator bar.

(1.3) Sift to break up clumps.

(1.4) Trowel out a slab of this mixture 0.100 in. thick. However, apply a mixture of 60% PVF, 40% graphite in the end regions around ports P1-P8 to achieve resistivity graduation as described above in connection with FIG. 2A.

(1.5) Preheat for 7 minutes at 350° F.

(1.6) Press for 7 minutes at 400° F at 256 psi.

(1.7) Cool for 7 minutes at 50° F at 256 psi.

(1.8) Release (2.0) for making sheets 113, 135 and 123, (2.1) Mix 40% PVF copolymer Kynar grade 3584 with 60% Dixon Grade 1112 graphite. Sieve copolymer to break up clumps.

(2.2) Blend as in (1.2).

(2.3) Sift as in (1.3).

(2.4) Trowel a slab as in (1.4)

(2.5) Preheat as in (1.5)

(2.6) Press as in (1.6)

(2.7) Cool as in (1.7)

(2.8) Release (3.0) for making cathodes 132 and 122, (3.1) Mix:
55% Dixon Grade 1175 graphite
5% Dixon Grade XC72 graphite which has been pulverized to go through a 40 mesh screen
40% PVF copolymer (Kynar grade 3584)

(3.2) Blend (PK blender without agitator bar) 6 minutes (3.3) Sift to break up clumps (3.4) Trowel a slab 3/16 in. thick (3.5) Preheat at 400° F for 7 minutes (3.6) Press at 400° F, 256 psi for 7 minutes (3.7) Cool at 50° F, 256 psi for 7 minutes (3.8) Release (3.10) To coat sheets 123, 135 with surface area enhancing layer, (coatings 122, 132)

(3.11) Using activated charcoal such as Darco 20/40, spread a coating ⅛ inch thick on the surface of the sheet.

(3.12) Preheat the coating and the sheet to 400° F for 3 minutes (3.13) Press at 400° F for 3 minutes at pressure of 200 psi (3.14) Cool at 50° for 3 minutes at a pressure of 200 psi (3.15) Release.

(4.0) To laminate sheets 114 and 113 with copper conductor 115, sheets 123 and 124 with cooper conductor 125.

(4.1) Sprinkle half complete monolayer of mixture of 60% grade 1112 graphite between the copper screen and the two sheets.

(4.2) Preheat at 400° F for 3 minutes.

(4.3) Press at 200 psi at 400° F for 3 minutes.

(4.4) Cool at 50° F at 200 psi for 3 minutes.

The differing graphite loading layers 113 and 114 (and of 123 and 124) throughout the major central portions thereof balance coefficients of thermal expansion and produce a flat resultant laminate which is important for later assembly and reliable cell dimensioning.

(5.0) To make anode surface 111, 131 suitable for ion plating:

(5.1) Trowel a ⅛ inch thick layer of 50 to 200 mesh coconut charcoal onto a conductive sheet made as in 2.0 or 3.0 above, (5.2) Preheat at 400° F for 3 minutes, (5.3) Press at 400° F and 200 psi for 3 minutes, (5.4) Cool at 50° F and 200 psi for 3 minutes.

(6.0) To laminate the coated cathode electrodes made per (3.0) above, the anode electrodes made per (3.0) above, the assemblies made per (4.0) above and to the sheets 130 (2.0), (6.1) Assemble layers and preheated the assembled parts 350° F for 3 minutes, (6.2) Press at 350° F for 3 minutes at 80 psi, (6.3) Cool under pressure and release, (6.10) The passages P1 and P8 and tributaries which carry conductive electrolyte need to be insulated as they pass through the electrodes. This is accomplished by resistivity grading as described above or as follows, (6.11) Mix 95% PVF copolymer (Kynar 3584) with 5% graphite (Dixon Grade 1112), (6.12) Trowel a slab 3/16 thick, (6.13) Preheat at 400° F for 7 minutes, (6.14) Press at 400° F for 7 minutes at 135 psi, (6.15) Cool at 50° F for 7 minutes at 135 psi, (6.16) Cut into plugs B 1/64 smaller in diameter than the holes in the electrodes themselves, (6.17) Insert plugs B (FIG. 2C) into the holes in the electrode sheet, (6.18) Preheat electrode sheet and the plug to 400° F for 7 minutes, (6.19) Press at 400° F for 7 minutes at 116 psi, (6.20) Cool at 50° F for 7 minutes at 116 psi, (6.21) Release. This technique may also be used for electrodes 110 and 120 in lieu of resistivity grading as described above.

(7.0) Fluid passages 101, 102, etc., are cut as grooves into gaskets 143, 144, 153, 163, 164.

(8.0) Stacks of cells are made up and in so doing the mating surfaces are coated with a sealant/adhesive (with coatings applied on grooved gasket faces above and below the groove — e.g. above and below groove 101/102 in FIG. 2B) to prevent liquid leakage. The grooved gasket faces butt against the membranes 145, 155, 165. Pressure plates (91, 92, 93) are applied at the ends of the stack and tied together with long bolts 99 to compressively grip the cell stack together in a manner well known in the art.

The anolyte and catholyte supplies (anolyte in and catholyte in) are indicated at A.I. amd C.I., respectively and the (spent) anolyte and catholyte drains at A.O. and C.O. respectively (anolyte out, catholyte out).

Therefore, anolyte comes into the stack through longitudinal channel P7, and catholyte comes in through longitudinal channel P8 of plate 91. The anolyte and catholyte continue in these channels through SB1 to press plate 93 where the anolyte traverses transverse channel 37 to P3 and the catholyte traverses transverse channel D48 to P4.

The anolyte and catholyte travel back longitudinally through SB1 via channels P3 and P4 respectively where they are distributed to the unit cells via branch tributaries as described in connection with FIGS. 2B and 2 above. After passing through the unit cells, and generating electrical power there, the anolyte and catholyte emerge, via branched tributaries, to respective return paths P5 and P6, then traverse transverse channels 26 and 15, respectively, then respectively traverse longitudinal paths P1 and P2, and then re-emerge from the cell stack on the outside of plate 91, as indicated by the lines A.O. and C.O.

Separator screens (not shown) are included in each of the anolyte and catholyte compartments to prevent the flexible diffusion barrier from deflecting over into contact with other electrodes confronting it. Suitable screens include Dupont's Vexar Model 10 PDS 169, which has high density polyethylene strands of 10 mil width criss-crossing in a diamond pattern with 16 strands per inch and affording 90% porosity and which can be corrugated to various depths of corrugation for fitting in different volumes of Hercules' Delnet brand embossed and stretched polypropylene sheet, Model GQ 330, affording a 75% porosity and having a thickness of 10–12 mils and raised button embossed projections to any desired separation depth.

The anolyte and catholyte compartments may be differentially pressurized to established a bias against diffusion of undesired ionic species. Such differential pressurization can be achieved through different respective pump sizes and/or speeds, flow passage sizes; or through throttle valves.

An alternative or supplement to pressure differential diffusion suppression is the use of a mid-compartment (not shown) in each unit fuel cell between anolyte and catholyte compartments and separated therefrom by diffusion barriers or coarser colloid barriers. Such mid-compartments, if used, may be provided with their own recirculating system with filters to trap certain diffusing species or may be pressurized to suppress in either direction.

Internal resistances in the converter may comprise the following components:

| | |
|---|---|
| resistivity of anolyte: | e.g. 2–6 ohm-in. for initial 20% NaCl in water average over operation of a converter |
| resistivity of catholyte: | e.g. 4–10 ohm-in. for 4 Molar FeCl$_3$ in water average over operation of a converter |
| resistance of 60 sq. in. separator: | about .05 ohm-in. for .010" thick 30% DARAMIC saturated with 25% NaCl solution or equivalent |

Other losses are pumping requirements to move electrolytes. In a typical case for 60 sq. in. electrodes at 0.5 amp/sq. in. current drain the pumps move anolyte at 0 to 1 cc/sec./cell, catholyte at 1 to 2 cc/sec./cell under a 8 to 10 foot head with a pressure differential between anolyte and catholyte corresponding to 1–2 feet of head.

Spacing in the electrolyte compartments for purposes of resistance calculation changes during a discharge. Anode to barrier spacing grows from 0.015 inches as metal deposited earlier during charge is consumed.

FLOW RATE 2 cc/sec. of 4M FeCl$_3$ corresponds to a reagent supply rate of 0.008 equivalent weights per second or about 30 ew/hour. At 30A ($\frac{1}{2}$A/in.$^2$) one consumes just over 1 ew/hr. (27 AH = 1ew). So supply rate is then about 30 times the stoichrometric requirement and, in any event, should be at least 10X. Since Fe$^{+3}$ concentration, goes from 4M to about 0.5M. There is a one-tenth of a molarity charge per pass.

EXAMPLE 1

A 60 sq. in. nominal electrode area single cell was made by assembling a flat sheet of armco iron, a terminal cathode prepared as in (6.0) as above (but using Calgon Corporation BPL grade charcoal) and a 0.010 inch thick Daramic polyethylene separator with 0.075 inch thick rectangular frame gaskets provided with integral electrolyte feed channels. An anolyte comprising 125 ml. of 20% (by weight) NH$_4$Cl in water was circulated through the anolyte compartment at a rate of 2cc/sec. and a catholyte comprising 500 ml. of 4 Molar FeCl$_3$ in water was circulated through the catholyte compartment at a rate of 2cc/sec.

The cell exhibited an open circuit potential of 1.100 v. and gave the following performance with time at 15.7 ampere drain:

| Min Time | $V_1$ | $V_d$ |
|---|---|---|
| 0 | . | 1.10 |
| 1 | .73 | 1.03 |
| 10 | .69 | .94 |
| 30 | .65 | .87 |
| 60 | .60 | .80 |
| 70 | .53 | .76 |
| 80 | .13 | .32 |
| 81 minutes | .62 | .85 |

As used above and hereinafter $V_1$ is load voltage and $V_d$ is driving potential, the latter being measurable by momentarily opening the load circuit.

EXAMPLE 2

Another cell was prepared as in Example 1 with the following changes:

Cathode — 40 to 80 mesh OL charcoal on a carbon/plastic composite substrate. Vexar screen crimped to 0.065 on anode side, all other constructional features being the same. The cell was charged at 15A and 3.5 Molar FeCl$_3$ circulated through anolyte compartment (500 ml). The charging voltage was 1.48 – 1.52 over 66 min at 15 amperes. Instantaneous open circuit voltage of 1.22 – 1.26 (Back EMF) was measured from time while charging. After charging the system was idle at 1.16 V$_{oc}$ with the same electrolytes. The system was discharged at 16.4 amps, V$_D$ was 1.06 to 1.02 and V$_L$ was 80 to 0.76 over 5 min. Then fresh NaCl anolyte was added and V$_D$ was 1.06 to 0.96 and V$_L$ was 0.81 to 0.72 over 4 minutes. Then fresh 4M FeCl$_3$ was added and V$_D$ was 1.08 at 16.4 amps and a flat V$_L$ was 0.84; Vo was 1.04 at 20 amps; V$_L$ was 0.79 flat; and V$_D$ was 0.99 to 0.30A; V$_L$ was 0.63.

EXAMPLE 3

A 60 in$^2$ cell 2 with energy advantage of 2AH/in$^2$ made as in Example 2 excepting the Anode had some iron in its surface before charging and that 0.055 in frames and crimped screens were used. The cell for 67 minutes at 15A amperes at 1.5 volts producing 1.21 Voc, discharged for 5 minutes at 16.6 amperes, 0.86 volts (10% NaCl, 2M FeCl$_2$); charged for 72 minutes at 15 amperes, 1.52 volts (1.18) (34 AH total); discharged for 5 minutes at 16.2A, 0.80V. (1.08) using electrolytes from discharge above; charged for 70 minutes at 15A, 1.55V. (1.22) using electrolytes from charge above (51AH); discharge for 6 minutes at 17A, 0.87V. (1.16) with fresh solutions; charged for 56 minutes at 15A, 153V. (64AH total.); discharge for 3 minutes at 16.8A, 0.88V. (1.74) with electrolytes used above. Charged for 52 minutes at 15A, 1.6V. (1.25) 76AH total; discharge for 10 minutes at 16.6A, 0.84 to 0.80 (1.14 – 1.10) same electrolytes as before; charge 87 minutes at 15A, 1.6V. (1.27) 96 AH total; discharge for 5 minutes at 16.5 0.84 (1.10); charge for 45 minutes at 15A, 1.59V. (1.25); idle 10 minutes Voc was 1.12; discharge 18 minutes at 16A, 0.84 (1.08) to 0.77 (1.08) old electrolytes; fresh NaCl, (1.12); idle to 1.20; fresh $FeCl_3$ 0.83 (1.18); charge 96 minutes at 15A, 1.65 (1.34); fresh electrolytes 1.46 (1.02); total of 120 AH in.

In summary, the cell was charged to a total of 2AH-/in$^2$ at a rate of 1/4 A/in$^2$; charging voltages ranged from 1.50 to 1.65V. (open circuit voltages from 1.18 to 1.34V.); 5 to 10 minute discharges during the charging process gave constant performance through all states of charge indicating that there was no degradation of the surface as capacity was increased and that the system is highly tolerant of cycle variations.

EXAMPLE 4

Cathode: 20 to 40 OL charcoal with no substrate
Anode: 50 to 200 coconut charcoal with no substrate
Vexar screens crimped to 0.065 in both compartments; 10 inch Daramic barrier; Anolyte: 300 ml of 4M $FeCl_2$; Catholyte: 500 ml of 4M $FeCl_2$; charged for 132 minutes at 15A or 33 AH; charging voltage 1.52 to 1.62V. Both EMF 1.21 to 1.31 volts idle to 1.16.

Fresh anolyte (10% NaCl) and fresh catholyte 4M $FeCl_3$ were added to produce an open circuit voltage of 1.23 volts. The cell was discharged at 16.4A; 0.84 volts (1.18 $V_D$ flat) for 12 minutes, then at 30A, 0.60Vl, 1.03 – 1.13$V_D$ (i.e., .014 to 017R).

EXAMPLE 5

Anode Polarization

Charging

4M $FeCl_2$ anolyte (0.5e) and catholyte (1e.); charged at 20A FOR 96 minutes (32AH); charging voltage 1.58 – 1.60V; open circuit (instantaneous) 1.20 to 1.23.

| Discharging A. (2M $FeCl_3$ catholyte) | | | | |
|---|---|---|---|---|
| Anolyte | Voc | $V_L V_D$ | $V_L V_D$ | I |
| 1.3 M $FeCl_2$ | .17 | .89 (1.16) | .88 (1.15) | 16.7A |
| 2 M $FeCl_2$ | 1.15 | .85 (1.12) | .84 (1.10) | 16.6A |
| 2.7 M | 1.11 | .79 (1.08) | .77 (1.07) | 16.7A |
| B. 2M $FeCl_3$ catholyte 500 ml | | | | |
| 1.3 M $FeCl_2$ | 1.17 | .89 (1.16) | .88 (1.15) | |
| 2 M $FeCl_2$ | 1.15 | .85 (1.12) | .84 (1.10) | |
| 2.7 M $FeCl_2$ | 1.11 | .79 (1.08) | .77 (1.07) | |
| Fresh catholyte at room temperature | | | | |
| 1.3 M $FeCl_2$ | 1.21 | .78 (1.14) | | |
| 6 M $FeCl_2$ | 1.16(1) | .75 (1.11) (3)- | .50 | ( .95) |
| 2 M $FeCl_2$ | 1.15 | .78 (1.14) | | |
| 6 M $FeCl_2$ | 1.14(1) | .72 (1.10) (4)- | .50 (1.00) | |

Performance is only slightly impaired by ferrous ion concentrations up to 4M; however, 6M ferrous chloride anolyte causes severe polarization of the anode. Since the anolyte is near saturated, additional ferrous chloride produced at the anode apparently crystallizes out on the surface.

Figure 3:
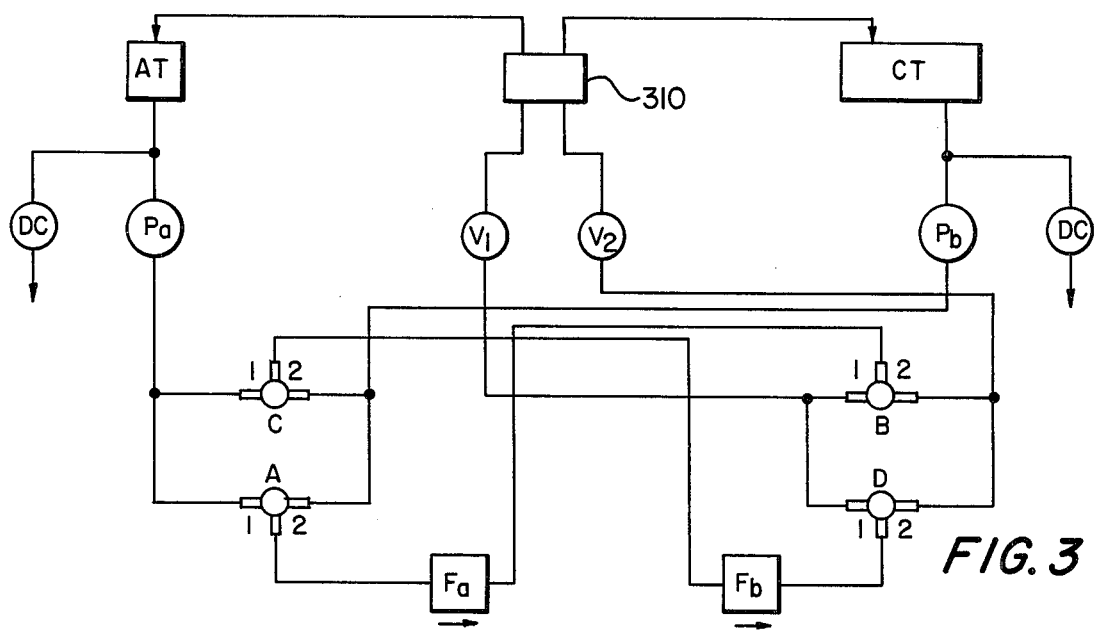
FIGS. 3 and 4 are schematic diagrams of filter crossing and series embodiments of the energy converter of the invention.

FIG. 3 shows another embodiment of the invention comprising a multi-cell energy conversion array package 310, two magnetically coupled centrifugal pumps $P_a$ and $P_b$ for anolyte and catholyte, two flow rate control valves, $V_1$ and $V_2$, in series with the pump, two solid particle line filters, $F_a$ and $F_b$, four — two way valves, A, B, C and D for switching filters from one hydraulic circuit to another. Interconnected anolyte and catholyte reservoir tanks AT and CT, two drain cocks, DC, for flushing the system. Valves A,B,C and D are two way switches which are employed to transfer filters $F_a$ and $F_b$ from anolyte to catholyte respectively and vice-versa. However, these valves also permit the flow of electrolyte from one tank to another depending upon the combination of positions.

In the normally operating mode the valves are in the following positions.

Valve A: position #1 or #2
Valve B: position #1 or #2
Valve C: position #2 or #1
Valve D: position #2 or #1

In the first set of positions filter $F_a$ is in the anolyte circuit and $F_b$ is in the catholyte circuit. With the valves in the second set of positions the filters are placed in the opposite circuits.

When it becomes necessary to transfer some anolyte to the catholyte circuit or vice-versa the valves are set in the appropriate positions. For example, with the valves in the following positions;

Valve A: position #1
Valve B: position #1
Valve C: position #1
Valve D: position #2 electrolyte flow is such that the catholyte does not drain out of its tank while the anolyte not only flows through $F_a$ into its tank, but also through $F_b$, through the catholyte compartment and into the catholyte tank. There is thus a net transfer of anolyte into the catolyte reservoir via the paths described. If valves $V_c$ and $V_d$ are put into positions #2 and #1 respectively, catholyte is transferred to the anolyte tank.

The sixteen available position combinations provide a large number of operational modes. Available circuit for mixing both electrolytes completely is the valve position combination, $V_A$: position #2
$V_B$: position #1
$V_C$: position #1
$V_D$: position #2

Figure 4:
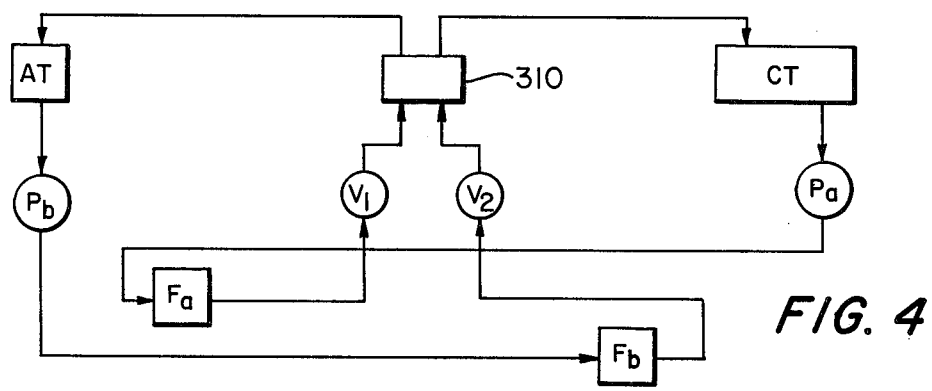

In this configuration, shown in FIG. 4, all circuits become one large, single series circuit.

The electrolytes become a single fluid within a fairly short time.

Both circulating pumps are located below the test stand platform to enable them to be primed rapidly. Drain cocks are provided near the exit connection to both tanks so that the system can be easily drained and flushed, or it can be used to obtain periodic samples of electrolyte for examination or analysis.

Fluid tanks can be interconnected so that any net flow of electrolyte via diffusion across the porous barrier can be compensated by automatic spill over into the appropriate tank. In this manner there is no chance of tank overflow or total depletion of anolyte or catholyte during long test periods. The tank volumes are designed for the maximum quantities of fluid one may practically encounter in the operation of a 10 cell array.

The anolyte tank has about a 2 to 3 liter usable volume and the catholyte tank about 6 gallons or 24 liters. For single cell testing separate 2 to 4 liter tanks may be connected to the test strand, or, it is possible to employ the fabricated tanks with very low liquid levels. The tanks are vented to the air at the immediate exit port of the cells to vent gases and to minimize the chance of creating undue pressure differentials across the barrier or with respect to the cell input and output.

Filters are AMF Cuno water filters with cartridges designed specifically to remove particulate matter of the size and form of iron oxides. These filters are all plastic in construction and easily dismantled for cartridge replacement. They hold about one liter of fluid and represent a sizeable portion of the total fluid for small devices. These devices can be reduced in size by cutting off the lower portion of the housing to a desired length, cementing a new base and then trimming filter cartridges to fit the shorter length.

Figure 5:
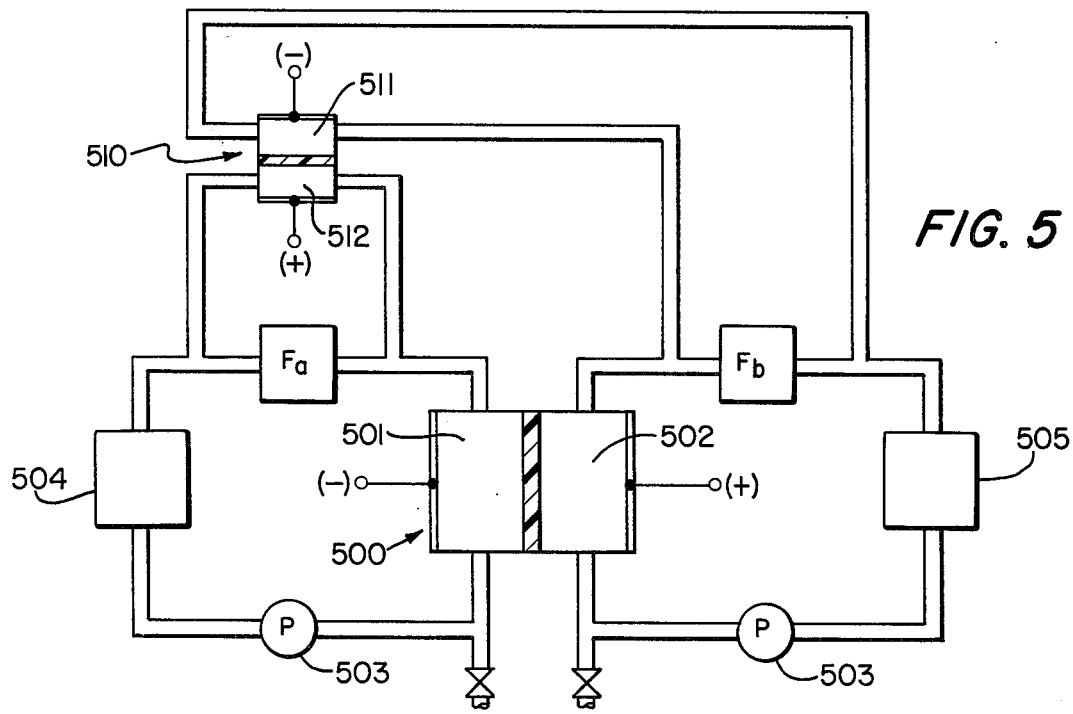
FIG. 5 is a schematic diagram of an embodiment of the energy conversion system of the invention utilizing an auxiliary cell.

FIG. 5 shows a further embodiment of the invention in which a fuel cell 500 comprises at least a one-cell (preferably more) construction in a major energy conversion device with an anolyte compartment 501 and catholyte compartment 502, both of which are fed by pumps 503. The anolyte flows in a recirculating closed loop comprising storage tank 504 and filter Fa. The catholyte flows in a recirculating closed loop which includes filter F6 and a reservoir 505.

An auxiliary energy conversion device 510 comprises an anolyte compartment 511 and a catholyte compartment 512 receiving bleed flows of less than 10% preferably less than 5%, by volume throughout, from the recirculating main electrolyte flows. The anolyte of the main cell is catholyte in the auxiliary cell and the catholyte of the main cell is anolyte in the auxiliary cell. The auxliary cell is electrically powered, preferably by trapping the power generation of the main cell to establish an overpotential across the auxiliary cell for overcharging to chlorine potential (2.0 volts or higher).

EXAMPLE 6

Figure 6:
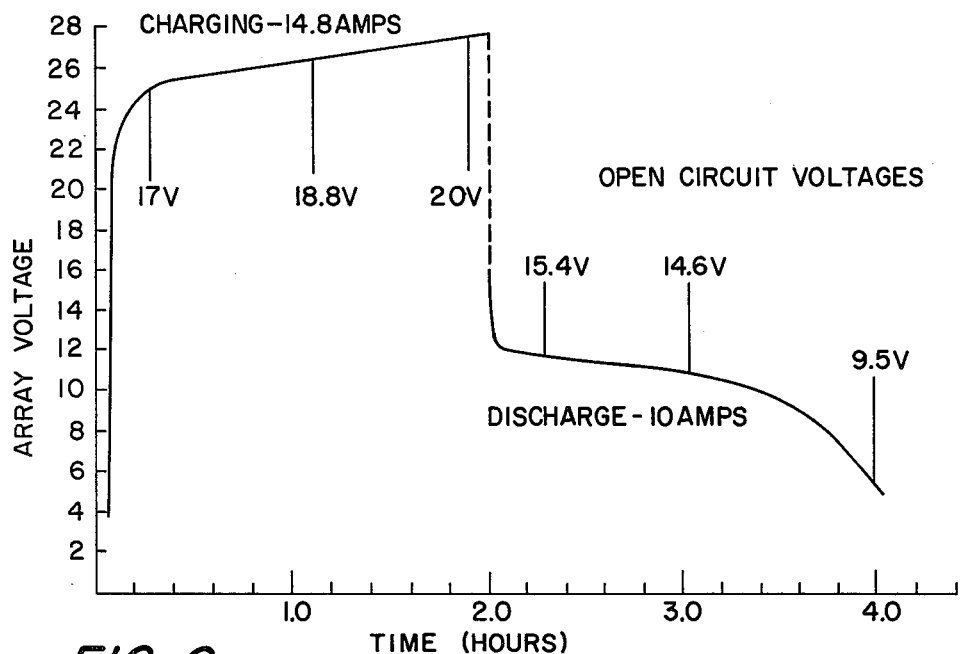
FIGS. 6-15 are curves of performance data for different fuel cells described in connection with examples 6 et seq.

Charge-discharge data was plotted as shown in FIG. 6 for a 14 cell array having 150 to 200 mil thick frames which had feeder holes drilled into edges of the plates to establish a leak free design. The array was assembled via gaskets and bolted end plates. The anolyte volume was about half a gallon, catholyte volume about 1.3 gallons and the molarity of the $FeCl_2$ solution was 3 to 3+ molar. The theoretical maximum capacity of unit is determined by 1.3 gal. of 3.2 molar is $1.3 \times 4$ liters = 5.2 liters of 3.2 molar. This is equivalent to $5.2 \times 3.2 = 16.6$ moles of $FeCl_2$. At a maximum of 17 ampere-hours per mole, one obtains $17 \times 16.6 = 283$ AH total for the array. Since there are 14 cells in the array, each cell could receive $283/14 = 20.2$ AH total, if the reagent utilization factors were 100%. No filters or pH adjustment apparatus were employed.

Charging the array at 15 amps for 2 hours gave an input of 30 AH. The output was 20 AH at 10 amp rate. Complete utilization of electrolyte was realized. Overcharging is evidenced by rise in open circuit voltage and charging voltage towards end of charge mode. Polarization losses are evidenced at this molarity range and depth of discharge and current densities by differences in o.c.v. for charge and discharge modes.

EXAMPLE 7

Figure 8:
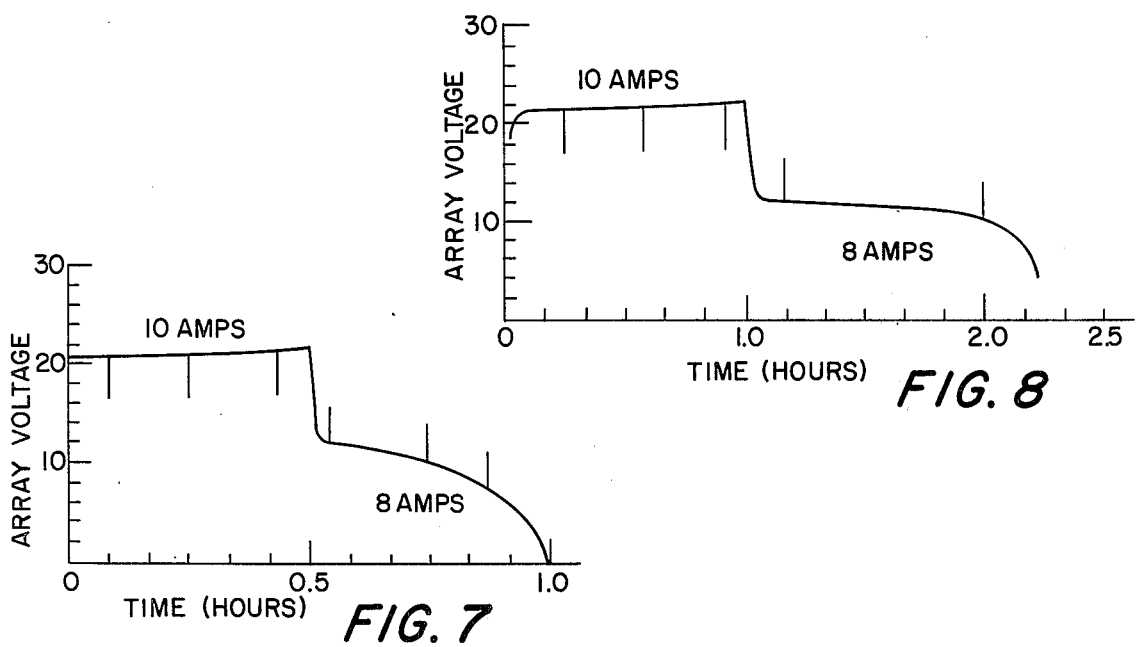
Figure 7:
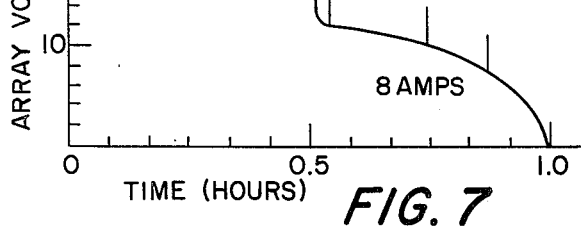

The Example 6 14 cell array was operated under same conditions of electrolyte volumes and molarity, etc. as in Example 6, excepting that charging was at 10 amperes and discharge at 8 amperes. Resulting for two such cycles are shown in FIGS. 7 and 8. The reagent utilization and current efficiency appear quite good. In the FIG. 7 run, there was 5 AH input and almost a 4 AH output. In the FIG. 8 run, the input was well over 8 AH. Polarization effects, e.g., the differences in o.c.v. of charge and discharge, appear less at these lower current densities compared to Example 6.

EXAMPLE 8

Figure 9:
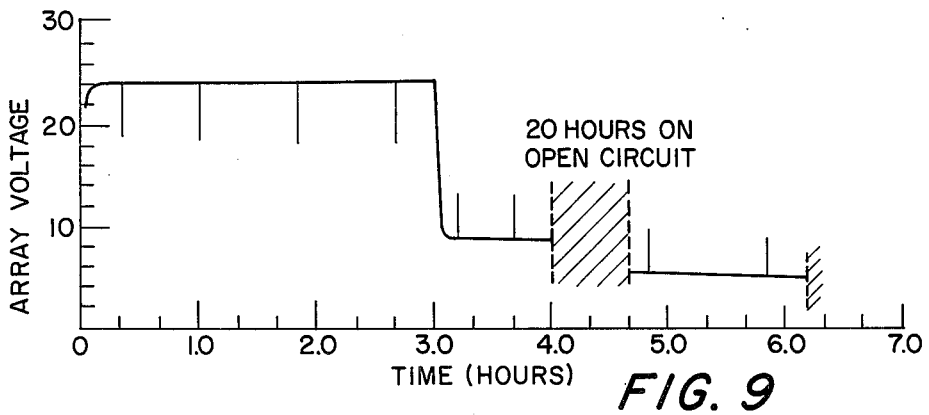

A 12 cell array assembled in same fashion as the 14 cell array of Examples 6–7. The electrolyte was 3 molar $FeCl_2$ initially and catholyte volume was about 4 gallons and anolyte 1 gallon. The coulombic capacity of this system is 4 gal. $\times$ 4 liters/gal. $\times$ 3 molar $\times$ 17 AH/mole $\times$ (1/12) cells = 68 AH. Performance is shown in FIG. 9.

Charging and discharging was done at 12 and 10 amperes, respectively, and this gives some significant polarization losses. After discharging at 10 amperes for one hour, the array was placed on open circuit for 20 hours with the array drained of electrolyte. Corrosion at the anode lowered the potential to 5.5 volts discharge at 10 A when cycling was resumed and energy efficiency was consequently reduced.

EXAMPLE 9

Figure 10:
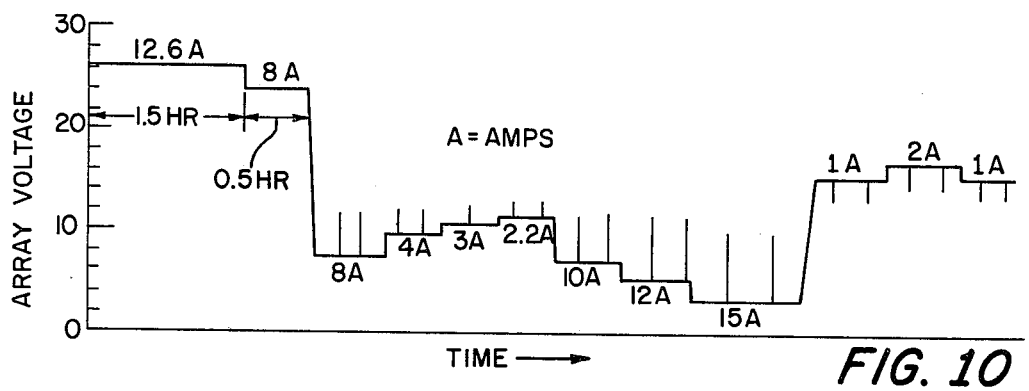
Figure 11:
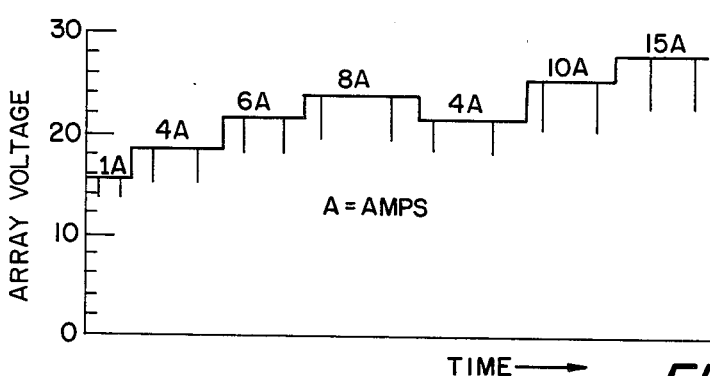

Example 8 was repeated with the difference that 4 gallons of 3M $FeCl_2$ containing 25 gm of sodium citrate per liter as chelating agent was used as catholyte and the resultant performance is shown in FIGS. 10 and 11.

Experiments were conducted to learn more than internal resistance changes and polarization voltages as a function of current density in a chelate containing electrolyte. Resistance values are obtained by dividing current into the difference between open circuit voltage, o.c.v., and cell voltage.

Internal resistance lies principally between 0.5 and 0.6 ohms as measured here. Polarization effects do not seem to become pronounced until 10 to 15 amperes drain is reached.

EXAMPLE 10

Figure 12:
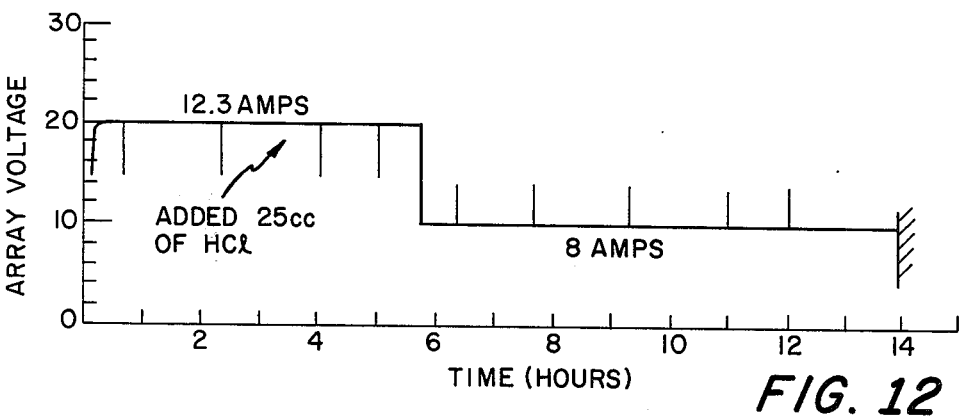

Then the example 8–9 testing was repeated with no chelate present. The catholyte was an initial 3M $FeCl_2$ solution. But this array was operated with a pH auxiliary control cell in series (as described above in connection with FIG. 5) and energized at the same current as the array. The resultant performance is shown in FIG. 12. The performance proved to be quite well behaved and with little polarization.

EXAMPLE 11

Figure 13:
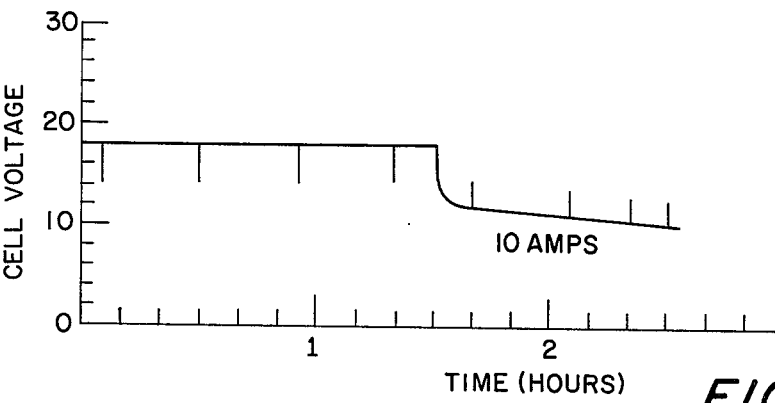

A single cell with interelectrode spacing between 0.15 and 0.20 inches was assembled and operated with catholyte comprising one liter of 3.5 M $FeCl_2$ solution with one pound of $ZnCl_2$ dissolved therein and performance is shown in FIG. 13. The zinc potential, 0.75 volts relative to hydrogen, was realized. However, the open circuit potential decayed rapidly upon discharge to the iron voltage at the anode, probably because only a limited amount of zinc ions are in solution. Some factor less than 100% of the plating ratio of Zn to Fe at the anode during the charging process is realized. Also, Zn is displaced by $Fe^{+2}$ ions in the anolyte.

EXAMPLE 12

Figure 14:
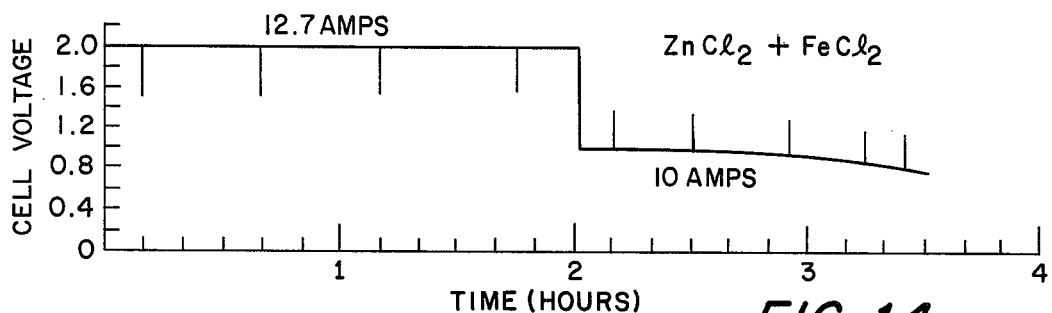

The same type of experiment as in Example 11 was repeated except that the catholyte was a mixture of 330 ml 9M $ZnCl_2$ solution plus 660 ml 4 M $FeCl_2$ solution and results are drawn in FIG. 14. The polarization and decay to the $Fe/Fe^{+3}$ couple voltage is essentially the same as in Example 11.

EXAMPLE 13

Figure 15:
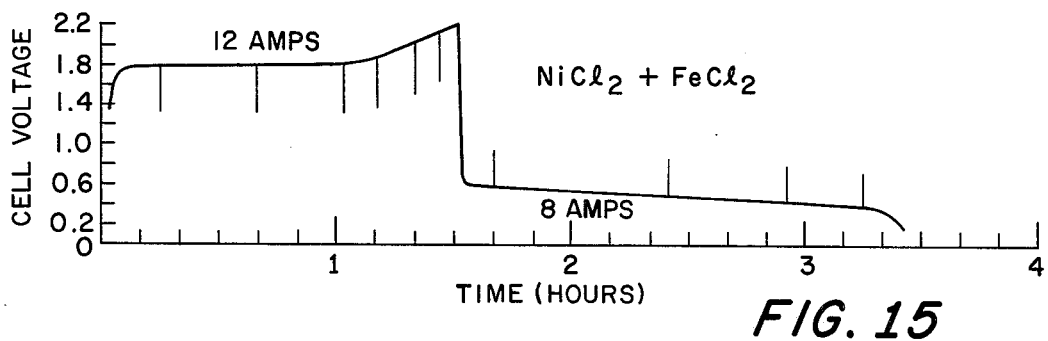

FIG. 15 shows the results of a repeat of Example 12 with a catholyte of 600 gm $NiCl_2$ salt in a 3.5 molar $FeCl_2$ solution. This $Ni/Fe^{+3}$ cell appears to be well behaved. Open circuit potential is less than those of the previous examples, as expected, but corrosion and polarization problems are also reduced as shown. Ampere-hour efficiency is quite high also, about 100% according to the curve. Hydrogen gas evolution at the Ni plated anode will also be less, as observed in these tests. We must, however, perform more future tests to fully characterize this couple and see if the reduced voltage and increased costs as compared to iron are useful trade-offs for the better behavior.

EXAMPLE 14

Sodium citrate was explored further as solubilizing agents for iron-oxygen compounds, corrosion inhibitor, buffering agents and "brighteners" for iron plating.

Resistivity change effects of sodium citrate, $Na_3C_6H_5O_7.5H_2O$, on various molarities of $FeCl_3$ solution at 21° C are given in the table below.

| $FeCl_3$ Molarity | $FeCl_3$ Specific Resistivity, ohm-in | | |
|---|---|---|---|
| | Grams of Sodium Citrate/liter | | |
| | 0 | 10 | 100 |
| 3.42 | 9.59 | — | 9.59 |
| 2.89 | 6.08 | 6.36 | 6.25 |
| 2.19 | 4.82 | 4.98 | 4.49 |
| 1.58 | 3.74 | — | 3.35 |

Virtually no effect was observed on specific resistivity due to the presence of sodium citrate salts up to concentrations of 100 gm/liter. These small variations in resistance are attributable mainly to experimental error in weighing, temperature measurements and voltmeter readings.

General observations made on the effects of citrate on iron plating and sedimentation of electrolytes are:

Presence of sodium citrate in electrolytes at a concentration range between 25 and 75 gram/liter very definitely reduces and almost totally prevents the precipitation of insoluble iron compounds under normal circumstances. This result is observed during cell operation in the anolyte circuit and with $FeCl_2$ solutions left standing in containers opened to the air for prolonged periods of time.

Higher concentrations of chelate, (10 or more grams/liter), produce iron plating which has a black appearance as contrasted with the usual silvery or metallic finish of iron plating. The plating appears somewhat porous but quite hard and adhesive. No rapid rusting is observed.

Very high concentration of citrate, (60 or greater gm/liter), seem to produce plating which becomes increasingly spongy and needle-like in character. Plating appears relatively stable in air.

Absence of any chelating agent in $FeCl_2$ solutions produces an iron plating which is not quite as adhesive to the carbon electrode surface and seems to have a sheeting or "shingle like" structure which is readily peeled in small sections. When exposed to air, the plating corrodes almost immediately.

Small quantities of chelate, (in the order of 1 gm/liter), has a definite effect on plating. Iron produced from this solution has a relatively smooth and silvery appearance, is surprisingly stable in air and behaves as a continuous surfacing of metal intimately attached to the carbon electrode substrate.

Based upon investigations, it appears that an initial molarity range of $FeCl_2$ solution between 2.5 and 4.0 is indicated for optimum cell performance.

Chelating agent, (sodium citrate), concentration of not less than 10 grams/liter and greater than 50 grams/liter is preferred for best solubilizing results while still retaining acceptable iron plating characteristics.

A single cell of 60 in² area electrodes will store 50–60 ampere-hours of iron without pronounced iron dendrite shorting. A solution of 3M $FeCl_2$ will provide about 30 to 35 ampere hours of charge when electrolyzed to a residual concentration of about 0.8M of $FeCl_2$. Hence a volume of about 2 liters of 3M $FeCl_2$ is an appropriate quantity of catholyte for the 4 ampere, 10 hour discharge experiments.

Barriers should be prewetted with a wetting agent, (surfactant), dissolved in methanol, ethanol or hexane for best performance. This need is especially true with the Celgard reinforced barrier which is employed throughout several of the units described above.

Electrolyte flow rates should not be less than 2cc per second on those cells with 0.10 in. interelectrode spacing. Such flows appear to be adequate supply rates of ionic species at the electrode surfaces with current densities up to 0.20 amp/in².

Cells with spacing of 0.10 in. between electrodes do not, unfortunately, make maximum use of the low electrolyte resistance. Resistance checks with full scale cells show that most of the resistance is the result of electrode properties. A cell with 60 in² area filled with 2.8 molar solution of $FeCl_2$ and no barrier has a total resistance, at 24° C, of 0.016 ohms. About 0.004 ohms is due to the electrolyte and somewhere in the region of 0.008 and 0.012 ohms are contributed by the electrode, depending upon concentration of electrolyte and wetting agents present. If a plan Celgard barrier is employed in such a cell its total resistance will be about 0.016 ohms with only ¼ of this quantity represented by the electrolytes. A reinforced Celgard, prewetted, barrier in the same cell results in a total resistance of 0.020 ohms. About ¼ of the total is now represented by the electrolyte.

The use of chelation involves sequestration of iron, and/or other plating/deplating metal(s) used, to prevent oxidation and aid plating and redissolution thereof. In particular $Fe^{+2}$ ions are preferentially chelated to make them unavailable for the reaction $Fe^{+2} + 2e \rightarrow Fe$ to enhance efficiency of zinc plating (where zinc and iron salts are both dissolved in the anolyte). Chelating agents particularly useful for the last mentioned purpose comprise α, α' -dipyrridyl
o - phenanthroline
protoporphyrin
nitro - o - phenanthroline As inhibitors of oxygen compounds of iron, one may use citrates, tartarates, oxalates, acetates, amines, purrolidine, ammonium sulfate, fluorides, thiocyanates and ether chains.

In addition to or in lieu of pH control to avoid the formation of insoluble iron compounds, the invention comprehends excluding air from the system by hermetic sealing and utilizing a non-water solvent for the salt. Alcohol is one such possibility. No $H^+$ or $OH^-$ ions are formed and there are no electrolytic decomposition products of methanol or ethanol to react with iron. $FeCl_2$, (anhydrous), is soluble in alcohol to about 100 gm of salt per 100 ml of solvent. $FeCl_3$ is also very soluble in alcohol.

A further important aspect of the invention control of the cathode surface, (surface of the positive electrode), which must have some characteristics which will cause the reactions to proceed with minimum starvation and poisoning or flooding effects. The following electrochemical half cell reaction occurs.

During charge — oxidation of $Fe^{+2}$, (ferrous ions), proceeds.

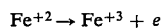
$$Fe^{+2} \rightarrow Fe^{+3} + e$$

During discharge — reduction of the $Fe^{+3}$, (ferric ions), takes place.

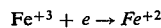
$$Fe^{+3} + e \rightarrow Fe^{+2}$$

Figure 16A:
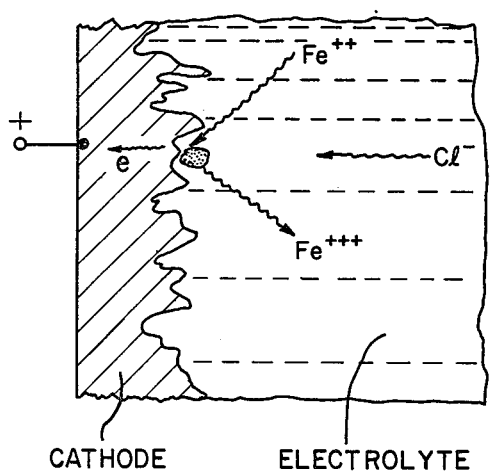
FIGS. 16A and 16B are schematic cross-section views of a cathode portion showing relevant phenomena of the operation mechanism during charge and discharge processes.
Figure 16B:
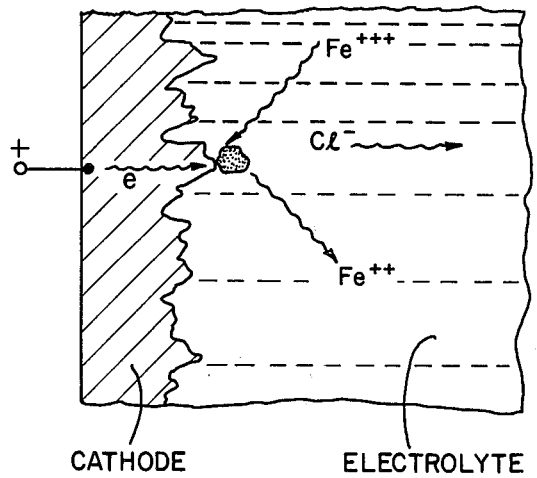

During either of these processes no iron ions, $Fe^{+2}$ or $Fe^{+3}$, are attracted to this electrode surface as a result of electric field gradients or electric polarity attraction because the electrode, (cathode), is (+) as are the ionic charges. Instead chloride ions are caused to migrate to the cathode via electric fields and currents. FIGS. 16A and 16B graphically illustrate this situation for charge and discharge processes, respectively. Since the iron ions are not supplied to the electrode surface where the oxidation or reduction process takes place, they must be supplied "mechanically", "physically" e.g., via forced fluid flow and thermal or molecular diffusion. Hence electrolyte is caused to flow near and over the surface of the cathode to provide for good mixing and supply of reagents. The electrode surface must have the following properties.

high electronic conductivity
 low work function for the oxidation — reduction electron exchange process.
 chemical inertness.
 easily manufacturable and attachable to the conductive substrate.
 low cost, readily available materials.
 physical structure which optimizes the necessary transport mechanisms. The surface area of the cathode should not only be as large as possible per frontal area of electrode but it must also be available or accessible to the inflow of $Fe^{+2}$ ions and exhaust flow of $Fe^{+3}$ ions during the charging mode and the opposite flow pattern during discharge.

An effective cathode surface in terms of such criteria is achieved with 40–80 mesh OL charcoal, manufactured by the Calgon Corp. bonded to the surface of a graphite-plastic conductive substrate. Polarization voltage drops less than 0.01 to 0.02 volts are obtained with such cathodes all the way up to current densities of 1 amp/in² with cells 80 to 90% discharged or with catholyte concentrations in the order of 0.5 to 1.0 M $FeCl_3$.

Substrate composition is also important following compositions of substrates (for anode and cathode) substituting polyvinyl chloride for more expensive fluorohydrocarbon binders allow cost reduction and their resistivities are as follows:

| | |
|---|---|
| Dixon Graphite #1112 | ~30% by weight |
| Diamond Shamrock PVC resin #500 | ~70% by weight |
| Bulk resistivity in direction of plane of sheet $\rho = 0.025$ ohm-in. | |
| Dixon Graphite #8485 | ~70% |
| Diamond Shamrock PVC #71AH | ~30% |
| $\rho = 0.053$ ohm-in. | |
| Graphite #8485 | ~60% |
| B.F. Goodrich PVC #124 | ~40% |
| $\rho = 0.07$ ohm-in. | |
| Graphite #8485 | ~30% |
| Goodrich #124 | ~70% |
| $\rho = 0.29$ ohm-in. | |
| Graphite #8485 | ~70% |
| Goodrich PVC #126 | ~30% |
| $\rho = 0.11$ ohm-in. | |
| Graphite #8485 | ~50% |
| Goodrich PVC #124 | ~50% |
| $\rho = 0.13$ ohm-in. | |

These plates are pressed in a contained mold with about 100 in² area under the following conditions.

Total force ~ 15 tons
Temperature ~ 350° F
Pressing time ~ 10 minutes

The dry powders are mixed in a PK blender for 15 minutes with rotating mixing bar.

These materials all appear quite strong mechanically and potentially suitable for the fuel cell system. A maximum resistivity value in the range of 0.10 ohm-in appears to be practical for substrate resistivity with the following criteria:

Electrodes should not contribute more than 10% to the total resistance of a cell.
 Electrodes may be in the range of 0.05 inches thick.
 Volume resistivity of graphite composites may be 5 to 10 times greater in the direction normal to the sheet than that value measured in the plane of the plate.
 electrolyte resistivity will be in the order of 2 to 6 ohm-inches.

Figure 17A:
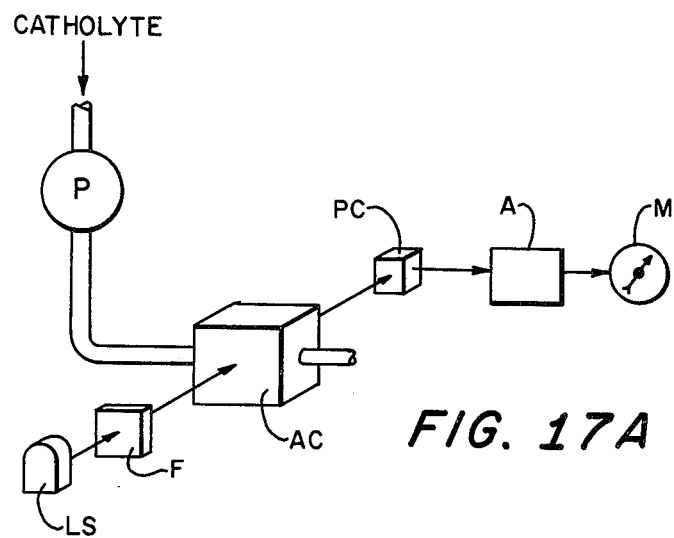
FIGS. 17A and 17B are schematic isometric views of state of charge sensing systems using colorimetry.
Figure 17B:
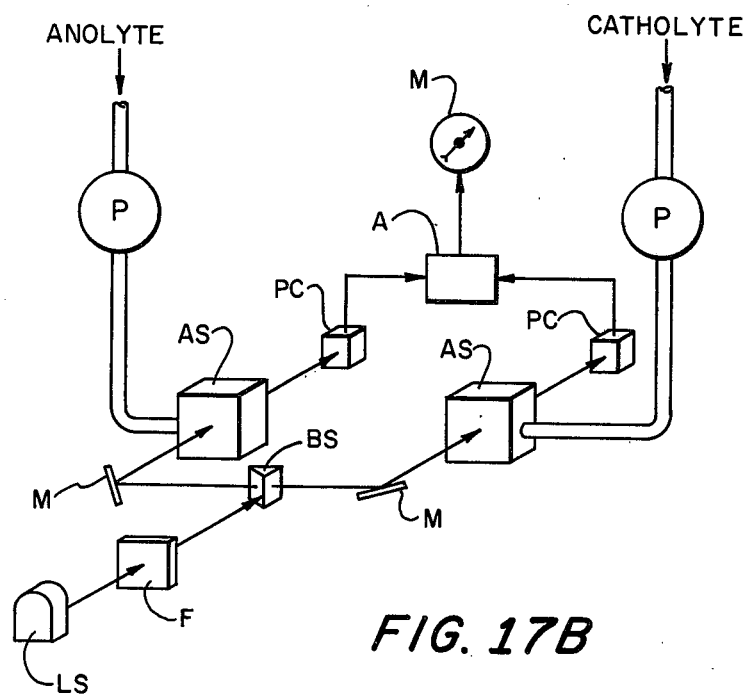

In any of the foregoing embodiments of the invention state of charge may be sensed by the absolute direct reading system of FIG. 17A or the comparative readout system of FIG. 17B in both which a (color) light source is LS and filter F pass through electrolyte in absorption cells(s) AS (after reflecting off beam splitter mirror BS in the FIG. 17B case) and then to photo-cell(s) PC and an amplifier A and an amplifier A and readout on meter M or passage of a state of charge correlated electrical signal to an automatic controller not shown. The systems are calibrated in accordance with Beer's Law $$I = Io \, e^{-\alpha X}$$

where $Io$ is intensity of incident light on cell AS, $I$ is transmitted light intensity, $X$ is absorption cell thickness and $\alpha$ is the electrolyte absortivity which is calibratable to concentration of dissolved solute (and more particularly differentiating $Fe^{+2}$ and $Fe^{+3}$ in connection with such concentration measurements) and thus to state of charge (or discharge).

Such state of charge measurement may also be carried out electrically by measuring electrolyte potential with respect to a reference electrode.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Energy conversion apparatus comprising, means defining at least a single electrolytic cell comprising anolyte and catholyte compartments separated by a diffusion barrier, means defining anode and cathode plastic carbon composite electrodes, respectively in said anolyte and catholyte compartments, means defining anolyte and catholyte liquid recirculating in closed loops which contain said compartments respectively, and recirculating the bulk storage means for said fluids, the fluids being solutions of metal salt which plate out metal on the anode during application of charging potential to the electrodes and deplate metal and redissolve it into the anolyte during discharge of the system and which change valence states within the catholyte without plating, electrolytic means for maintaining catholyte molarity between 2.0 and 4.0, means for preventing oxidation of the plating/deplating metal to combat polarization and maintain reversibility over extended charge/discharge cycling.

2. Energy conversion apparatus in accordance with claim 1 and further comprising, means defining an auxiliary electrolytic device with at least a single cell pair of anolyte and catholyte compartments separated by diffusion barrier means and comprising therein anode and cathode electrode means, respectively, and a power supply connected to said anode and cathode electrodes for maintaining across said electrodes an overvoltage (compared to the full charge potential of the electrochemical pair of the main electrolytic device), means for bleeding a minor portion of the recirculating anolyte of the main electrolytic device through said auxiliary electrolytic device and returning it to the recirculating loop of the main electrolytic device, the auxiliary electrolytic device being poled so that said anolyte from the main electrolytic device passes through the catholyte compartment of the auxiliary electrolytic device and so that pH of main electrolytic device anolyte is decreased by electrolytic production of hydrogen ion the auxiliary electrolytic device to counteract the pH-increasing tendency of the main electrolytic device, whereby stable operation at high efficiency is enabled over long periods of time, and means for essentially continuously passing an electrolyte through the anolyte compartment of the auxiliary device.

3. Energy conversion apparatus in accordance with claim 2 wherein said means for continuously pasing electrolyte through the anolyte compartment of the auxiliary electrolytic device comprises a bleed from, and return to, the recirculating catholyte, of the main electrolyte device, of a minor portion of the said catholyte.

4. Energy conversion apparatus in accordance with claim 3 wherein said bleed electrolyte flows comprise less than 10% of main flows of the respective electrolytes from which they are bled.

5. Energy conversion apparatus in accordance with claim 1 wherein said anolyte and catholyte comprise at least one cation selected from the group consisting of iron, nickel and zinc and a chloride anion.

6. Energy conversion apparatus in accordance with claim 5 wherein said anolyte comprises iron and zinc components which plate out as an alloy layer on the anode in charging and substantially reversibly redissolve in the anolyte on discharge.

7. Energy conversion apparatus in accordance with claim 1, and further comprising means for draining catholyte from said catholyte compartments back to its reservoir to turn off power generation.

8. Energy conversion apparatus in accordance with claim 1 and further comprising, means defining filters in the recirculating anolyte and catholyte loops, and means for periodically switching the filters between loops to allow chemical cleansing of such filters.

9. Energy conversion apparatus in accordance with claim 1 comprising an aqueous solvent in said anolyte solution.

10. Energy conversion apparatus in accordance with claim 1 comprising a non-aqueous solvent in said an anolyte solution.

11. Energy conversion apparatus in accordance with claim 1 comprising a chelating agent in said anolyte solution to sequester the plating/deplating metal thereby enhancing plating and redissolution thereof and preventing its oxidation.

12. Energy conversion apparatus in accordance with claim 1 comprising a multi-cell array.

13. Energy conversion apparatus in accordance with claim 12 wherein individual cells of the array are arranged back-to-back using bipolar electrodes.

* * * * *